US008201041B2

(12) United States Patent
Lin

(10) Patent No.: US 8,201,041 B2
(45) Date of Patent: Jun. 12, 2012

(54) TRANSMISSION CONTROL METHODS AND DEVICES FOR COMMUNICATION SYSTEMS

(75) Inventor: Tzu-Ming Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 980 days.

(21) Appl. No.: 12/137,792

(22) Filed: Jun. 12, 2008

(65) Prior Publication Data

US 2009/0049356 A1 Feb. 19, 2009

Related U.S. Application Data

(60) Provisional application No. 60/929,576, filed on Jul. 3, 2007, provisional application No. 60/929,799, filed on Jul. 12, 2007, provisional application No. 61/006,792, filed on Jan. 31, 2008.

(51) Int. Cl.
*H04L 1/18* (2006.01)
*G08C 25/02* (2006.01)

(52) U.S. Cl. ...................................................... 714/748

(58) Field of Classification Search .......... 714/748–751; 370/248, 328
See application file for complete search history.

(56) References Cited

U.S. PATENT DOCUMENTS

| 6,301,249 | B1 | 10/2001 | Mansfield et al. |
| 6,724,843 | B1 | 4/2004 | Clarkson et al. |
| 2006/0282739 | A1 | 12/2006 | Meyer et al. |
| 2007/0124642 | A1 | 5/2007 | Suh et al. |
| 2007/0268981 | A1 | 11/2007 | Heiskala |
| 2009/0150739 | A1* | 6/2009 | Park et al. ................. 714/749 |

FOREIGN PATENT DOCUMENTS

| CN | 1541466 | 10/2004 |
| JP | 10-2004-61079 | 7/2004 |

OTHER PUBLICATIONS

Wiemann, H.; Meyer, M.; Ludwig, R.; Chang Pae O; "A Novel Multi-Hop ARQ Concept," in proceeding of Vehicular Technology Conference—VTC 2005 spring, vol. 5, pp. 3097-3101, in Jun. 2005.
Lott, M.; "ARQ for Multi-Hop Networks," in proceeding of Vehicular Technology Conference—VTC 2005 fall, vol. 3, pp. 1708-1712, in Sep. 2005.

(Continued)

*Primary Examiner* — Shelly A Chase

(74) *Attorney, Agent, or Firm* — Finnegan, Henderson, Farabow, Garrett & Dunner, LLP

(57) ABSTRACT

A system and method for transmission control in a wireless communication system, including receiving data for transmission to a receiving device, and forwarding the data to a subordinate device. The method also includes initiating a timer, and generating a supplemental receipt indicator. If the intermediate device receives at least one of a receipt indicator and one or more subordinate supplemental receipt indicators before expiration of the timer, the intermediate device includes the generated supplemental receipt indicator with the receipt indicator or one or more subordinate supplemental receipt indicators, and sends the indicators to a next superordinate device. If the intermediate device does not receive at least one of a receipt indicator or one or more subordinate supplemental receipt indicators before the expiration of the timer, the intermediate device sends the generated supplemental receipt indicator to the next superordinate device.

57 Claims, 15 Drawing Sheets

OTHER PUBLICATIONS

IEEE C802.16j-06_176r1, "An Advanced ARQ Scheme (A²RQ) on relay Link for 802.16j" (Nov. 2006).

IEEE C802.16j-07_250r6, "An ARQ in IEEE 802.16j" (May 2006).

IEEE 802.16-2004, "Air Interface for Fixed Broadband Wireless Access Systems" (Oct. 2004).

IEEE 802.16j-07/470r1, Technical Comments to P802.16j Baseline Document: 6.3.4 ARQ Operation—MR-ARQ (Sep. 2007).

"Notice to Submit a Response" issued by Korean Intellectual Property Office on Feb. 23, 2010 in Korean Application No. 2008-0063958 and English translation thereof.

* cited by examiner

TRANSMISSION CONTROL METHODS AND DEVICES FOR COMMUNICATION SYSTEMS

PRIORITY

This application claims the benefit of priority of U.S. Provisional Application No. 60/929,576, filed Jul. 3, 2007, U.S. Provisional Application No. 60/929,799, filed Jul. 12, 2007, and U.S. Provisional Application No. 61/006,792, filed Jan. 31, 2008, all of which are incorporated by reference herein in their entirety for any purpose.

TECHNICAL FIELD

The present disclosure relates generally to methods and devices for communication systems and, more particularly, to methods and devices for transmission control in data communication systems.

BACKGROUND

Wireless communication systems allow wireless devices to communicate without the necessity of wired connections. Because wireless systems have become so integrated into daily life, there is a growing demand for wireless communication systems that support multimedia services such as speech, audio, video, file and web downloading, and the like. To support these multimedia services for wireless devices, various wireless communication systems and protocols have been developed to accommodate the growing demands of multimedia services over wireless communication networks.

One such protocol is Wideband Code Division Multiple Access (W-CDMA), which is promulgated by the $3^{rd}$ Generation Partnership Project (3GPP™), a collaboration of numerous standards development organizations. W-CDMA is a wideband spread-spectrum mobile air interface that uses a direct sequence Code Division Multiple Access (CDMA).

Communication in such wireless systems may include both single-hop and multi-hop transmission. In single-hop wireless transmission, an origination node communicates directly with the destination node. In contrast, in multi-hop wireless transmission, an origination node of a wireless system may communicate with a destination node using one or more intermediate nodes, sometimes called relay nodes. In some systems, the relay node may be referred to as a relay station, and the combination of nodes and connections between an originating node and a destination node may be referred to as a transmission path. Relay-based systems may be found in any type of wireless network.

FIG. 1 is a diagram of an exemplary prior art wireless network 100 having both multi-hop and single-hop transmission. The exemplary wireless network 100 of FIG. 1 is based on the Institute of Electrical and Electronics Engineers (IEEE) 802.16 family of standards. As shown in FIG. 1, wireless network 100 may include one or more transmitters, e.g., base station (BS) 110, one or more relay stations (RS) 120, including RSs 120a, 120b, and 120c, and one or more subscriber stations (SS) 130, including SSs 130a, 130b, 130c, and 130d.

In wireless network 100, communication between an origination node (e.g., BS 110) and a destination node (e.g., SS 130a, SS 130b, SS 130c, SS 130d, etc.) may be achieved using one or more relay stations (e.g., RS 120a, RS 120b, RS 120c, etc.). For example, in wireless network 100, RS 120a may receive data from BS 110 and send the data to another relay station (e.g., RS 120b). Alternatively, RS 120a may receive data from another relay station (e.g., RS 120b), and send it to BS 110. As another example, RS 120c may receive data from RS 120b and send the data to a supported subscriber station (e.g., SS 130a). Alternatively, RS 120c may receive data from a subscriber station (e.g., SS 130a), and send it to a dominant relay station (e.g., RS 120b). These are examples of multi-hop transmissions. In single-hop transmission in wireless network 100, communication between the origination node (e.g., BS 110) and the destination node (e.g., SS 130d) may be achieved directly. For example, BS 110 may send data directly to SS 130d, and SS 130d may send data directly to BS 110.

A wireless system 100, such as described in FIG. 1, may implement a Media Access Control (MAC) frame format based on the IEEE 802.16 family of standards using Orthogonal Frequency-Division Multiple Access (OFDMA). In wireless system 100, transmission time may be divided into variable length sub-frames: an uplink (UL) sub-frame and a downlink (DL) sub-frame. Generally, the UL sub-frame may include ranging channels, a channel quality information channel (CQICH), and UL data bursts containing data.

The DL sub-frame may include a preamble, a Frame Control Header (FCH), a DL-MAP, a UL-MAP, and a DL data burst area. The preamble may be used to provide a reference for synchronization. For example, the preamble may be used to adjust a timing offset, a frequency offset, and power. The FCH may contain frame control information for each connection including, for example, decode information for SSs 130.

The DL-MAP and UL-MAP may be used to allocate channel access for both uplink and downlink communication. That is, the DL-MAP may provide a directory of access slot locations within the current downlink sub-frame, and the UL-MAP may provide a directory of access slot locations within the current uplink sub-frame. In the DL-MAP, this directory may take the form of one or more DL-MAP Information Elements (MAP IEs). Each MAP IE in the DL-MAP may contain parameters for a single connection (i.e., the connection with a single SS 130). These parameters may be used to identify where, in the current sub-frame, a data burst may be located, the length of the data burst, the identity of the intended recipient of the data burst, and one or more transmission parameters.

For example, each MAP IE may contain a Connection ID (CID), identifying the destination device (e.g., SS 130a, SS 130b, SS 130c, SS 130d, etc.) for which a data burst is intended, a Downlink Interval Usage Code (DIUC), representing a downlink interval usage code by which downlink transmission is defined, an OFDMA Symbol Offset, indicating the offset of the OFDMA symbol in which a data burst starts, a sub-channel offset, indicating the lowest-index OFDMA sub-channel for carrying the burst, etc. Other parameters may also be included in the MAP IE such as, for example, a boosting parameter, a parameter indicating a number of OFDMA symbols, a parameter indicating a number of sub-channels, etc. As used herein, prior art MAC headers (e.g., FCH) and MAP IEs may be referred to as connection-switched control data.

The DL-MAP and UL-MAP may each be followed by the data burst area. The data burst area may include one or more data bursts. Each data burst in the data burst area may be modulated and coded according to the control type of a corresponding connection-switched control data. Generally, the DL-MAP and UL-MAP may be referred to as packet data units (PDUs) or simply packet data.

An exemplary transmission control mechanism for use in systems such as the wireless network 100 of FIG. 1 is Automatic Repeat Request (ARQ). Using ARQ, the devices of a wireless system (e.g., BS 110, RSs 120a, 120b, and 120c, and SSs 130*a*, 130*b*, 130*c*, and 130*d*, etc.) may be configured to retransmit packet data when the packet data is either not received by the intended recipient or received with errors. The ARQ transmission control mechanism may use a combination of ACKs, NACKs, and timeouts to communicate the status of transmitted data. Exemplary ARQ protocols may include Stop-And-Wait (SAW), Go-Back-N, and Selective Repeat.

In a wireless system using ARQ transmission control mechanisms, when the receiving device receives packet data (new or retransmitted), the receiving device may generate and send either an ACK or a NACK to the transmitting device. An ACK may be an acknowledgment indicator, included within or as an attachment to a message, and may be sent by a receiver to a transmitter to indicate that the receiver has correctly received the transmitted data. A NACK may be a negative acknowledgment indicator, included within or as an attachment to a message, and may be sent by a receiver to the transmitter indicating that the transmitted data has been received with one or more errors.

FIG. 2 is a signaling diagram 200 illustrating operation of an exemplary end-to-end ARQ transmission control mechanism. As shown in FIG. 2, in systems implementing distributed resource allocation, each node in the transmission path allocates resources to the next node in the relay path. For example, in a system implementing distributed resource allocation, BS 110 may allocate resources for RS 120*a*, denoted by the arrow between BS 110 and RS 120*a*. Similarly, RS 120*a* may allocate resources for RS 120*b*, denoted by the arrow between RS 120*a* and RS 120*b*, and so on. In a system using centralized resource allocation, BS 110 may transmit control information to all nodes in a transmission path, e.g., RS 120*a*, RS 120*b*, RS 120*c*, and SS 130*a*, to perform resource allocation. In either case, after the resource allocation has been completed, BS 110 may send data to the destination node, SS 130*a* via the intermediate nodes RS 120*a*, RS 120*b*, and RS 120*c*. In addition, BS 110 may store a copy of the sent data in a buffer. In the example of FIG. 2, the data may consist of eight (8) packets of data.

RS 120*a* may successfully receive the 8 packets of data, store a copy of the data in its buffer, and send the data to RS 120*b*. Between RS 120*a* and RS 120*b*, however, 2 packets of data may be lost due to corruption, interference, error, etc., and RS 120*b* may receive only 6 packets of data. RS 120*b* may transmit the 6 packets of data to RS 120*c* and store a copy of the transmitted data in its buffer. Similarly, RS 120*c* may receive the 6 packets of data, transmit the 6 packets of data to SS 130*a*, and store a copy of the transmitted data in its buffer. However, between RS 120*c* and SS 130*a* another 3 packets of data may be lost, resulting in only 3 packets of data being successfully received by SS 130*a*. Upon receipt of the 3 packets of data, SS 130*a* may send an ACK indicator along the uplink transmission path to BS 110 via RS 120*c*, RS 120*b*, and RS 120*c*. The ACK indicator may be used to identify and acknowledge successful receipt of the 3 packets of data. When BS 110 receives the ACK indicator, BS 110 may purge the buffer of the identified 3 packets of data.

Once BS 110 has purged the buffer, BS 110 may prepare 3 packets of new data to transmit to SS 130*a*. In some scenarios, BS 110 may communicate with each of RSs 120*a*, 120*b*, and 120*c* to determine how to localize retransmission of data so that each RS 120 can receive the correct data from its most direct node in the uplink direction (i.e., superordinate node). When BS 110 has determined how to localize retransmission, BS 110 may then re-allocate the resources along the transmission path by means of the centralized allocation of resources. Alternatively, performing distributed allocation of resources, each node in the transmission path may re-allocate resources to a next node along the transmission path (uplink or downlink). In either case, once the resources have been re-allocated, BS 110 may then send the 3 packets of new data to SS 130*a* via RS 120*a*. RS 120*a* may then add the 2 packets of data lost between RS 120*a* and RS 120*b* to the data for retransmission to RS 120*b* (i.e., Data (2+3')). RS 120*b* may receive Data (2+3'), transmit Data (2+3') to RS 120*c*, and store the new data (i.e., Data (3')) in its buffer. Similarly, RS 120*c* may receive Data (2+3') and add the 3 packets of data lost between RS 120*c* and SS 130*a* to Data (2+3') resulting in Data (5+3'). RS 120*c* may transmit Data (5+3') to SS 130*a*, and store a copy of the new data (i.e., Data (3')) in its purge buffer. SS 130*a* may receive both the new and retransmitted data (i.e., Data (5+3')), and transmit an ACK indicator to BS 110 via RS 120*a*, RS 120*b*, and RS 120*c*. The transmitted ACK indicator may acknowledge receipt of 8 packets of data (i.e., ACK (5+3')), with 3 packets being new data and 5 packets being retransmitted data. Upon receipt of the ACK indicator, BS 110 may purge its buffer of both the new and old data.

FIG. 3*a* is a signaling diagram 300*a* illustrating operation of an exemplary ARQ transmission control mechanism operable in systems employing two-segment or hop-by-hop ARQ. In a system using a two-segment ARQ transmission control mechanism, an access node (e.g., intermediate nodes RS 120*a*, RS 120*b*, and RS 120*c*) sends an ACK indicator back to the transmitting node (e.g., BS 110) to indicate the current state of the transmission and whether or not the transmission is successfully received by the access node. Here, an access node refers to the intermediate node (e.g., RS 120*a*, RS 120*b*, RS 120*c*, etc.) communicating directly with the intended destination node (e.g., SS 130*a*, SS 130*b*, SS 130*c*, SS 130*d*, etc.). For example, the access node corresponding to SS 130*a* may be RS 120*c*.

Similarly to FIG. 2, FIG. 3*a* shows that BS 110 may transmit control information to all nodes in a transmission path to perform resource allocation in a system performing centralized allocation of resources. For example, for a transmission path from BS 110 to SS 130*a*, BS 110 may perform resource allocation for RS 120*a*, RS 120*b*, RS 120*c*, and SS 130*a*. In the alternative, in a system performing distributed allocation of resources, each node in the transmission path may allocate resources to a next node along the transmission path (uplink or downlink). For example, for a transmission path from BS 110 to SS 130*a*, BS 110 may perform resource allocation from BS 110 to RS 120*a*, RS 120*a* may perform resource allocation from RS 120*a* to RS 120*b*, RS 120*b* may perform resource allocation from RS 120*b* to RS 120*c*, and RS 120*c* may perform resource allocation from RS 120*c* to SS 130*a*. In either case, once the resource allocation has been completed, BS 110 may send data to the destination node, SS 130*a*, via the intermediate nodes RS 120*a*, RS 120*b*, and RS 120*c*. In addition, BS 110 may store a copy of the sent data in a buffer. In the example of FIG. 3*a*, the data may consist of eight (8) packets of data.

RS 120*a* may successfully receive the 8 packets of data, store a copy of the received data in its buffer, and send the data to RS 120*b*. Between RS 120*a* and RS 120*b*, however, 2 packets of data may be lost due to corruption, interference, error, etc., and RS 120*b* may receive only 6 packets of data. RS 120*b* may transmit the 6 packets of data to RS 120*c* and store a copy of the transmitted data in its buffer. In addition, RS 120*b* may send an ACK indicator to BS 110 acknowledging receipt of 6 packets of data.

RS 120*c* may receive the 6 packets of data, transmit the 6 packets of received data to SS 130*a*, and store a copy of the transmitted data in its buffer. RS 120c may send a pre-ACK indicator to BS 110 acknowledging receipt of the 6 packets of data. In the transmission between RS 120c and SS 130a, however, another 3 packets of data may be lost, resulting in only 3 packets of data being successfully received by SS 130a. Upon receipt of the 3 packets of data, SS 130a may send an ACK indicator along the uplink transmission path to BS 110 via RS 120c, RS 120b, and RS 120c. The ACK indicator may be used to identify and acknowledge successful receipt of the 3 packets of data. When BS 110 receives the ACK indicator, BS 110 may purge the buffer of the identified 3 packets of data.

Once BS 110 has purged its buffer, BS 110 may prepare 3 packets of new data to transmit to SS 130a. In some scenarios, BS 110 may communicate with each of RSs 120a, 120b, and 120c to determine the localized retransmission of data so that each RS 120 can receive the correct data from its most direct node along the uplink direction (i.e., superordinate node). When BS 110 has determined how to localize retransmission, in a system performing centralized allocation of resources, BS 110 may then re-allocate the resources along the transmission path. Alternatively, in a system performing distributed allocation of resources, each node in the transmission path may re-allocate resources to a next node along the transmission path (uplink or downlink). In either case, once the resources have been re-allocated, BS 110 may send the 3 packets of new data to SS 130a via RS 120a. RS 120a may then add the 2 packets of data lost between RS 120a and RS 120b to the data for retransmission to RS 120b (i.e., Data (2+3')). RS 120b may receive Data (2+3'), transmit Data (2+3') to RS 120c, and store the new data (i.e., Data (3')) in its buffer. Similarly, RS 120c may receive Data (2+3') and add the 3 packets of data lost between RS 120c and SS 130a to Data (2+3'), resulting in Data (5+3'). RS 120c may transmit Data (5+3') to SS 130a, and store a copy of the new data (i.e., Data (3')) in its purge buffer. SS 130a may receive both the new and retransmitted data (i.e., Data (5+3')), and transmit an ACK indicator to BS 110 via RS 120a, 120b, and 120c. The transmitted ACK indicator may acknowledge receipt of 8 packets of data (i.e., ACK (5+3')), with 3 packets being new data and 5 packets being retransmitted data. Upon receipt of the ACK indicator, BS 110 may purge its buffer of both the new and old data.

FIG. 3b is a signaling diagram 300b illustrating operation of an exemplary ARQ transmission control mechanism using pre-ACK or per-hop ACK communication similar to that of FIG. 3a. As in FIG. 3a, FIG. 3b shows that BS 110 may transmit control information to all nodes in a transmission path, e.g., RS 120a, RS 120b, RS 120c, and SS 130a, to perform resource allocation in a system performing centralized resource allocation. In the alternative, in a system performing distributed allocation of resources, each node in the transmission path may allocate resources to a next node along the transmission path (uplink or downlink). In either case, once the resource allocation has been completed, BS 110 may send data to the destination node, SS 130a, via the intermediate nodes RS 120a, RS 120b, and RS 120c. In addition, BS 110 may store a copy of the sent data in its buffer. In the example of FIG. 3b, the data may consist of eight (8) packets of data.

RS 120a may successfully receive the 8 packets of data, store a copy of the data in its buffer, and send the data to RS 120b. In addition, RS 120a may send a pre-ACK indicator to BS 110 acknowledging receipt of the 8 packets of data. Between RS 120a and RS 120b, however, 2 packets of data may be lost due to corruption, interference, error, etc., and RS 120b may receive only 6 packets of data. RS 120b may transmit the 6 packets of data to RS 120c and store a copy of the transmitted data in its buffer. In addition, RS 120b may send a pre-ACK indicator to BS 110 acknowledging receipt of 6 packets of data.

RS 120c may receive the 6 packets of data, transmit the 6 packets of data to SS 130a, and store a copy of the transmitted data in its buffer. RS 120c may send a pre-ACK indicator to BS 110 acknowledging receipt of the 6 packets of data. In the transmission between RS 120c and SS 130a, however, another 3 packets of data may be lost, resulting in only 3 packets of data being successfully received by SS 130a. Upon receipt of the 3 packets of data, SS 130a may send an ACK indicator along the uplink transmission path to BS 110 via RS 120c, RS 120b, and RS 120c. The ACK indicator may be used to identify and acknowledge successful receipt of the 3 packets of data.

In contrast to FIG. 3a, however, FIG. 3b exemplifies a scenario in which BS 110 prepares 8 packets of new data for transmission to SS 130a. As a result, RS 120a will receive 8 packets of new data and add the 2 packets of data that were lost between RS 120a and RS 120b. Upon receipt of the data (i.e., Data (2+8')), RS 120b may experience congestion and/or buffer overflow. RS 120b may attempt to forward the received Data (2+8') to RS 120c, and RS 120c may similarly experience congestion and/or buffer overflow. A similar result is achieved when RS 120c adds the 3 packets of data previously lost between RS 120c and SS 130a (i.e., Data (5+8')), and sends the Data (5+8') to SS 130a. That is, SS 130a will also experience congestion and/or buffer overflow.

Because of the increased number of segments in a transmission path, the effects of error detection and correction may be felt more acutely in a multi-hop wireless network than in a single-hop wireless network. In addition, both intra-cell handover (e.g., between RS 120c and RS 120b) and inter-cell handover (e.g., between RS 120c and an RS 120 outside the coverage of BS 110) may also increase the effects of error detection and correction in a wireless network. For example, referring to FIG. 1, if SS 130c moves from RS 120c to RS 120b, packet data that may not yet have been transmitted by RS 120c to SS 130c before handover may be lost, requiring end-to-end retransmission of packet data. As another example, if SS 130c moves from RS 120c to another RS 120 outside of range of coverage of BS 110 (not shown in FIG. 1), packet data that may not yet have been transmitted by RS 120c to SS 130c before handover may also be lost, and require end-to-end retransmission of packet data. Thus, traditional error detection and correction in multi-hop transmission may cause significant increases in overhead, longer delays, and wasted resources.

The disclosed embodiments are directed to overcoming one or more of the problems set forth above.

SUMMARY OF THE INVENTION

In one exemplary embodiment, the present disclosure is directed to a method for transmission control in a wireless communication system. The method includes determining a transmission resource allocation for at least one segment of a transmission path between a transmitting device and a receiving device, wherein the transmission path includes one or more intermediate devices, and transmitting, by the transmitting device, data to the receiving device. The method further includes receiving, by the transmitting device from the one or more intermediate devices, one or more supplemental receipt indicators, wherein the one or more supplemental receipt indicators are associated with the data sent to the receiving device, and determining a retransmission resource allocation for the at least one segment of the transmission path between the transmitting device, the one or more intermediate devices, and the receiving device. In addition, the method includes initiating retransmission of the data based on at least one of the one or more supplemental receipt indicators.

In another exemplary embodiment, the present disclosure is directed to a wireless communication station for wireless communication. The wireless communication station includes at least one memory to store data and instructions, and at least one processor configured to access the memory and, when executing the instructions, to determine a transmission resource allocation for at least one segment of a transmission path between a transmitting device and a receiving device, wherein the transmission path includes one or more intermediate devices, and transmitting, by the transmitting device, data to the receiving device. The at least one processor is further configured to receive, by the transmitting device from the one or more intermediate devices, one or more supplemental receipt indicators, wherein the one or more supplemental receipt indicators are associated with the data sent to the receiving device, and determine a retransmission resource allocation for the at least one segment of the transmission path between the transmitting device, the one or more intermediate devices, and the receiving device. In addition, the at least one processor is configured to initiate retransmission of the data based on at least one of the one or more supplemental receipt indicators.

In one exemplary embodiment, the present disclosure is directed to a method for transmission control in a wireless communication system. The method includes receiving, by an intermediate device, transmission data for transmission to a receiving device, and forwarding the transmission data to the receiving device or a next subordinate intermediate device in a transmission path between the intermediate device and the receiving device. The method also includes initiating a timer, wherein the timer is set according to a round-trip transmission time between the intermediate device and the receiving device, and generating a supplemental receipt indicator. If the intermediate device receives at least one of a receipt indicator and one or more subordinate supplemental receipt indicators before an expiration of the timer, the method further includes including the generated supplemental receipt indicator with the at least one of the receipt indicator and the one or more subordinate supplemental receipt indicators, and sending the at least one of the receipt indicator and the one or more subordinate supplemental receipt indicators and the included generated supplemental receipt indicator to a next superordinate intermediate device in the transmission path between the intermediate device and a transmission device. If the intermediate device does not receive at least one of a receipt indicator or one or more subordinate supplemental receipt indicators before the expiration of the timer, the method further includes sending the generated supplemental receipt indicator to the next superordinate intermediate device or the transmission device.

In another exemplary embodiment, the present disclosure is directed to a wireless communication station for wireless communication. The wireless communication station includes at least one memory to store data and instructions, and at least one processor configured to access the memory and, when executing the instructions, to receive, by an intermediate device, transmission data for transmission to a receiving device, and forward the transmission data to the receiving device or a next subordinate intermediate device in a transmission path between the intermediate device and the receiving device. The at least one processor is also configured to initiate a timer, wherein the timer is set according to a round-trip transmission time between the intermediate device and the receiving device, and generate a supplemental receipt indicator. If the intermediate device receives at least one of a receipt indicator and one or more subordinate supplemental receipt indicators before an expiration of the timer, the at least one processor is configured to include the generated supplemental receipt indicator with the at least one of the receipt indicator and the one or more subordinate supplemental receipt indicators, and send the at least one of the receipt indicator and the one or more subordinate supplemental receipt indicators and the included generated supplemental receipt indicator to a next superordinate intermediate device in the transmission path between the intermediate device and a transmission device. If the intermediate device does not receive at least one of a receipt indicator or one or more subordinate supplemental receipt indicators before the expiration of the timer, the at least one processor is configured to send the generated supplemental receipt indicator to the next superordinate intermediate device or the transmission device.

In another exemplary embodiment, the present disclosure is directed to a method for operating a wireless communication device in a wireless communication system. The method includes setting a device state to a first state, wherein the first state is an initial state, and changing, upon occurrence of a first triggering event, the device state from the first state to a second state, wherein the second state is defined as one in which data has been transmitted and a relay timer has not expired. The method further includes changing, when the relay timer expires, the device state from the second state to a third state and initiating retransmission of the data, and changing, when the relay timer has not expired and the wireless communication device receives one of an intermediate node NACK indicator, an end node NACK indicator, or a timeout, the device state from the second state to the third state. Further, the method includes changing, when the wireless communication device receives an end node ACK indicator and the relay timer has not expired, the device state from the second state to a fourth state.

In another exemplary embodiment, the present disclosure is directed to a wireless communication device for wireless communication. The wireless communication device includes at least one memory to store data and instructions, and at least one processor configured to access the memory and, when executing the instructions, to set a device state to a first state, wherein the first state is an initial state. In addition, the at least one processor is further configured to change, upon occurrence of a first triggering event, the device state from the first state to a second state, wherein the second state is defined as one in which data has been transmitted and a relay timer has not expired. Furthermore, the at least one processor is configured to change, when the relay timer expires, the device state from the second state to a third state and initiate retransmission of the data, and change, when the relay timer has not expired and the wireless communication device receives one of an intermediate node NACK indicator, an end node NACK indicator, or a timeout, the device state from the second state to the third state. Additionally, the at least one processor is configured to change, when the wireless communication device receives an end node ACK indicator and the relay timer has not expired, the device state from the second state to a fourth state.

DETAILED DESCRIPTION

Figure 4:
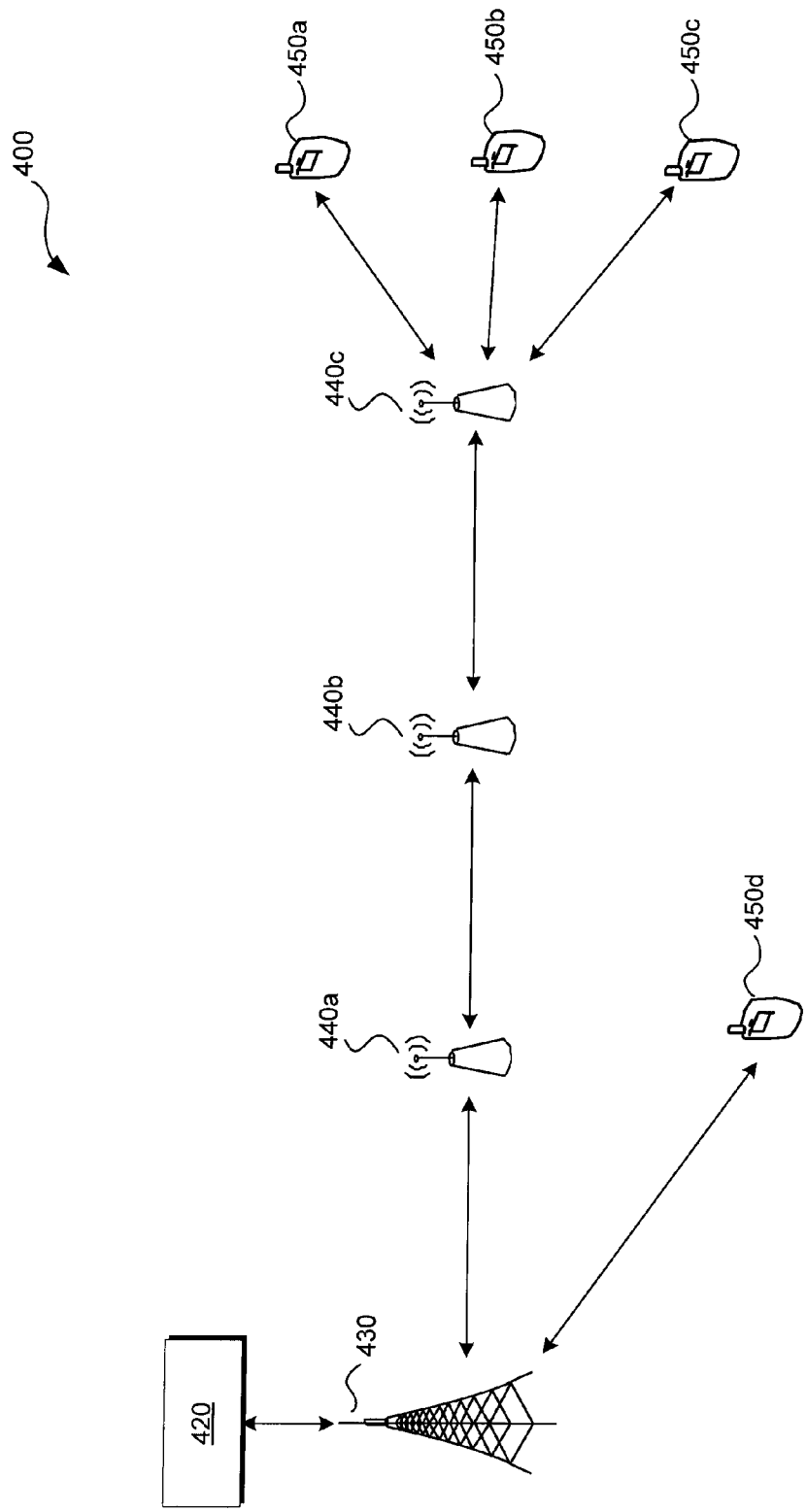
FIG. 4 is a block diagram of an exemplary wireless communication system, consistent with certain disclosed embodiments.

FIG. 4 is a block diagram of an exemplary wireless communication system 400. The exemplary wireless communication system 400 of FIG. 4 may be based, for example, on the Institute of Electrical and Electronics Engineers (IEEE) 802.16 family of standards. As shown in FIG. 4, wireless communication system 400 may include one or more Radio Network Controllers (RNC) 420, e.g., RNC 420, one or more base stations (BS) 430, e.g., BS 430, one or more relay stations (RS) 440, e.g., RS 440a, RS 440b, and RS 440c, and one or more subscriber stations (SS) 450, e.g., SS 450a, SS 450b, SS 450c, and SS 450d.

RNC 420 may be any type of communication device configured to operate in exemplary wireless communication system 400, many of which are known in the art. RNC 420 may be responsible for resource management, mobility management, encryption, etc. in wireless communication system 400. In addition, RNC 420 may be responsible for the control of one or more BSs 430.

Figure 5A:
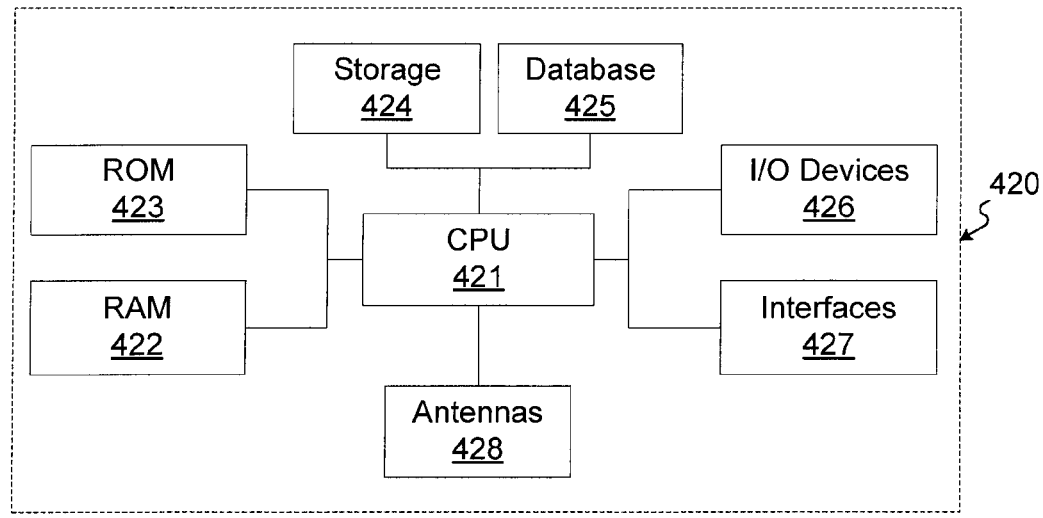
FIG. 5a is a block diagram of an exemplary radio network controller (RNC), consistent with certain disclosed embodiments.

FIG. 5a is a block diagram of an exemplary RNC 420, consistent with certain disclosed embodiments. As shown in FIG. 5a, each RNC 420 may include one or more of the following components: a central processing unit (CPU) 421 configured to execute computer program instructions to perform various processes and methods, random access memory (RAM) 422 and read only memory (ROM) 423 configured to access and store information and computer program instructions, a memory 424 to store data and information, databases 425 to store tables, lists, or other data structures, I/O devices 426, interfaces 427, antennas 428, etc. Each of these components is well-known in the art and will not be discussed further.

BS 430 may be any type of communication device configured to transmit and/or receive data and/or communications to and from one or more RSs 440 and/or SSs 450 in wireless communication system 400, many of which are known in the art. In some embodiments, BS 430 may also be referred to as, for example, a Node-B, a base transceiver system (BTS), an access point, etc. Communication between BSs 430 and RNC 420 may be any combination of wired and/or wireless connections. Communication between BSs 430 and RSs 440 may be wireless. Similarly, communication between BSs 430 and SSs 450 may be wireless. In one exemplary embodiment, BS 430 may have a broadcast/reception range within which BS 430 may wirelessly communicate with one or more RSs 440 and/or one or more SSs 450. Broadcast ranges may vary due to power levels, location, and interference (physical, electrical, etc.).

Figure 5B:
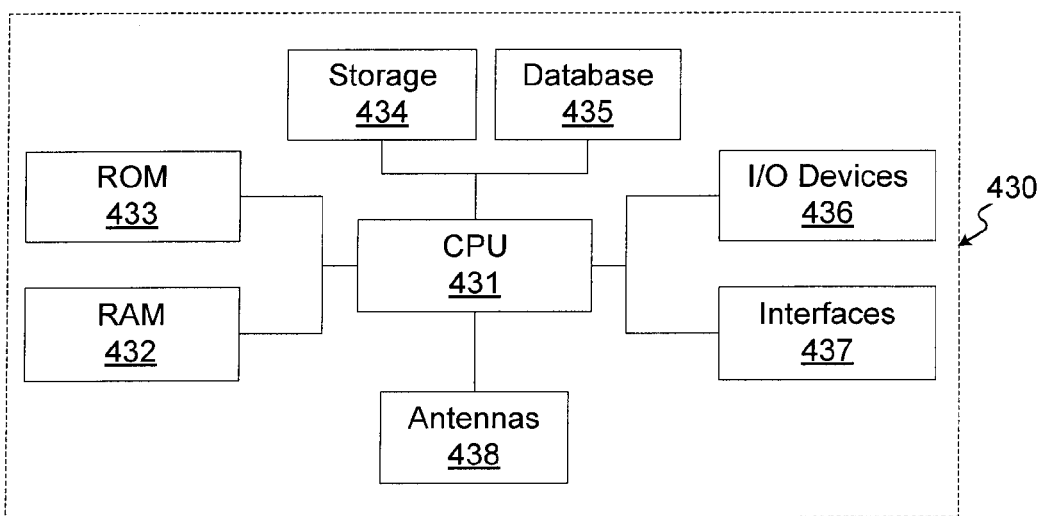
FIG. 5b is a block diagram of an exemplary base station (BS), consistent with certain disclosed embodiments.

FIG. 5b is a block diagram of an exemplary BS 430, consistent with certain disclosed embodiments. As shown in FIG. 5b, each BS 430 may include one or more of the following components: at least one central processing unit (CPU) 431 configured to execute computer program instructions to perform various processes and methods, random access memory (RAM) 432 and read only memory (ROM) 433 configured to access and store information and computer program instructions, memory 434 to store data and information, databases 435 to store tables, lists, or other data structures, I/O devices 436, interfaces 437, antennas 438, etc. Each of these components is well-known in the art and will not be discussed further.

RS 440 may be any type of computing device configured to wirelessly transmit and/or receive data to and from BS 430, one or more other RSs 440, and/or one or more SSs 450 in wireless communication system 400, many of which are known in the art. Communication between RS 440 and BS 430, one or more other RSs 440, and one or more SSs 450 may be wireless. In one exemplary embodiment, RS 440 may have a broadcast/reception range within which RS 440 may wirelessly communicate with BS 430, one or more RSs 440, and/or one or more SSs 450. Broadcast ranges may vary due to power levels, location, and interference (physical, electrical, etc.).

Figure 5C:
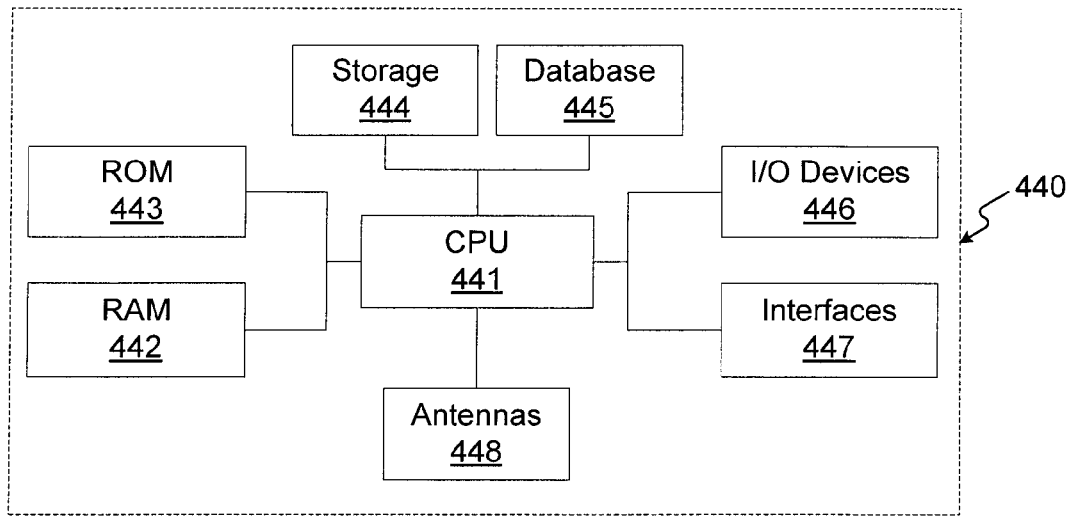
FIG. 5c is a block diagram of an exemplary relay station (RS), consistent with certain disclosed embodiments.

FIG. 5c is a block diagram of an exemplary RS 440, consistent with certain disclosed embodiments. As shown in FIG. 5c, each RS 440 may include one or more of the following components: at least one central processing unit (CPU) 441 configured to execute computer program instructions to perform various processes and methods, random access memory (RAM) 442 and read only memory (ROM) 443 configured to access and store information and computer program instructions, memory 444 to store data and information, databases 445 to store tables, lists, or other data structures, I/O devices 446, interfaces 447, antennas 448, etc. Each of these components is well-known in the art and will not be discussed further.

SS 450 may be any type of computing device configured to wirelessly transmit and/or receive data to and from BS 430 and/or one or more RSs 440 in wireless communication system 400. SS 450 may include, for example, servers, clients, desktop computers, laptop computers, network computers, workstations, personal digital assistants (PDA), tablet PCs, scanners, telephony devices, pagers, cameras, musical devices, etc. In addition, SS 450 may include one or more wireless sensors in a wireless sensor network configured to communicate by means of centralized and/or distributed communication. In one exemplary embodiment, SS 450 may be a mobile computing device. In another exemplary embodiment, SS 450 may be a fixed computing device operating in a mobile environment, such as, for example, a bus, a train, an airplane, a boat, a car, etc.

Figure 5D:
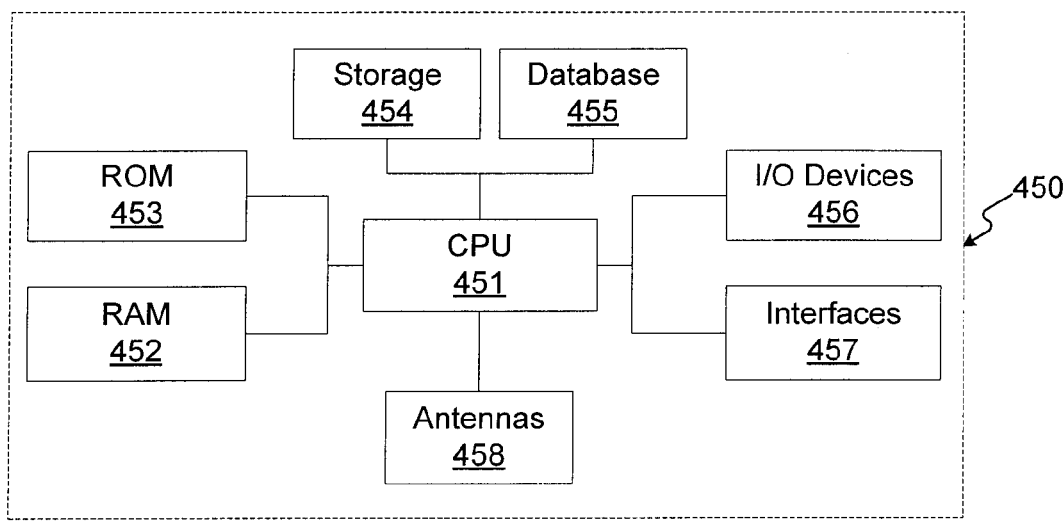
FIG. 5d is a block diagram of an exemplary subscriber station (SS), consistent with certain disclosed embodiments.

FIG. 5*d* is a block diagram of an exemplary SS 450, consistent with certain disclosed embodiments. As shown in FIG. 5*d*, each SS 450 may include one or more of the following components: at least one central processing unit (CPU) 451 configured to execute computer program instructions to perform various processes and methods, random access memory (RAM) 452 and read only memory (ROM) 453 configured to access and store information and computer program instructions, memory 454 to store data and information, databases 455 to store tables, lists, or other data structures, I/O devices 456, interfaces 457, antennas 458, etc. Each of these components is well-known in the art and will not be discussed further.

In addition, each node in wireless communication system 400 (e.g., BS 430, RSs 440*a*, 440*b*, and 440*c*, and SSs 450*a*, 450*b*, 450*c*, and 450*d*) may include one or more timers, referred to herein as "relay retransmission timers." In one exemplary embodiment, the relay retransmission timers may reflect a lifetime value of the data. Each of the one or more relay retransmission timers may be comprised of any combination of hardware and/or software. In addition, each of the one or more relay retransmission timers may include mechanisms by which the relay retransmission timer may be correlated with the transmission of data. That is, each relay retransmission timer may be set based on a determined round-trip time to a specified destination node (e.g., SS 450*a*, SS 450*b*, SS 450*c*, SS 450*d*, etc.).

For example, a relay retransmission timer for RS 440*a* may be set with a time that takes into account the total transmission time for the round-trip transmission path including RS 440*a*, RS 440*b*, RS 440*c*, and SS 450*a*. Similarly, a relay retransmission timer for RS 440*b* may be set with a time that takes into account the total transmission time for the round-trip transmission path including RS 440*b*, RS 440*c*, and SS 450*a*, and a relay retransmission timer for RS 440*c* may be set with a time that takes into account the total round-trip transmission time for the transmission path including RS 440*c* and SS 450*a*. In addition to the round-trip transmission time, the total transmission time may also include one or more timing offsets such as, for example, timing offsets for data processing, transmission node and receiving node transition gaps (e.g., Tx/Rx), additional local retransmission time, etc. In one exemplary embodiment, the total transmission time, $T_{total}$, may be defined by the following equation:

$$T_{total} = T_{Round\_Trip} + \Delta t, \qquad \text{Equation 1}$$

wherein:
$T_{Round\_Trip}$ is the round-trip transmission time between the transmitting node and the destination node; and
$\Delta t$ includes the one or more timing offsets.

In one exemplary embodiment, values associated with each relay retransmission timer may be determined during connection setup, and the value of the relay retransmission timer may be set accordingly. In other embodiments, values associated with each relay retransmission timer may be determined during network entry, when one or more transmission conditions is first determined, and/or when one or more transmission conditions changes. For example, upon entry of RS 440*c* to a network, such as wireless communication system 400, the component values associated with one or more of the relay retransmission timers of RS 440*c* (e.g., $T_{Round\_Trip}$, $\Delta t$, etc.) may be determined, and the total values of the one or more relay retransmission timers (e.g., $T_{total}$, etc.) may be set.

In the exemplary systems and methods disclosed herein, there may be three ARQ modes. The first ARQ mode is referred to herein as an end-to-end mode. That is, the ARQ transmission control mechanisms operate from one end of a transmission path (e.g., BS 430 or SS 450) to another end of the same transmission path (e.g., SS 450 or BS 430). The second ARQ mode is referred to herein as a two-segment ARQ mode. The two-segment ARQ mode is one in which the ARQ transmission control mechanisms operate between a "relay link," the link between BS 430 and an access RS 440 (i.e., the RS 440 serving an SS 450 in a transmission path), and an "access link," the link between the access RS 440 and the SS 450 it services. The third ARQ mode is referred to herein as hop-by-hop ARQ. Hop-by-hop ARQ transmission control mechanisms are those which operate between two adjacent nodes in a transmission path. For example, referring to FIG. 4, hop-by-hop ARQ would operate between BS 430 and RS 440*a*, between RS 440*a* and RS 440*b*, between RS 440*b* and RS 440*c*, and between RS 440*c* and SS 450*a*.

In some embodiments, two-segment ARQ mode may be applicable in both tunnel and non-tunnel based forwarding. Hop-by-hop ARQ mode may be applicable in non-tunnel based forwarding, and may be supported when RS 440 operates using distributed resource allocation. Configuration of RS 440 for a particular ARQ mode is performed during RS 440 network entry.

Figure 6:
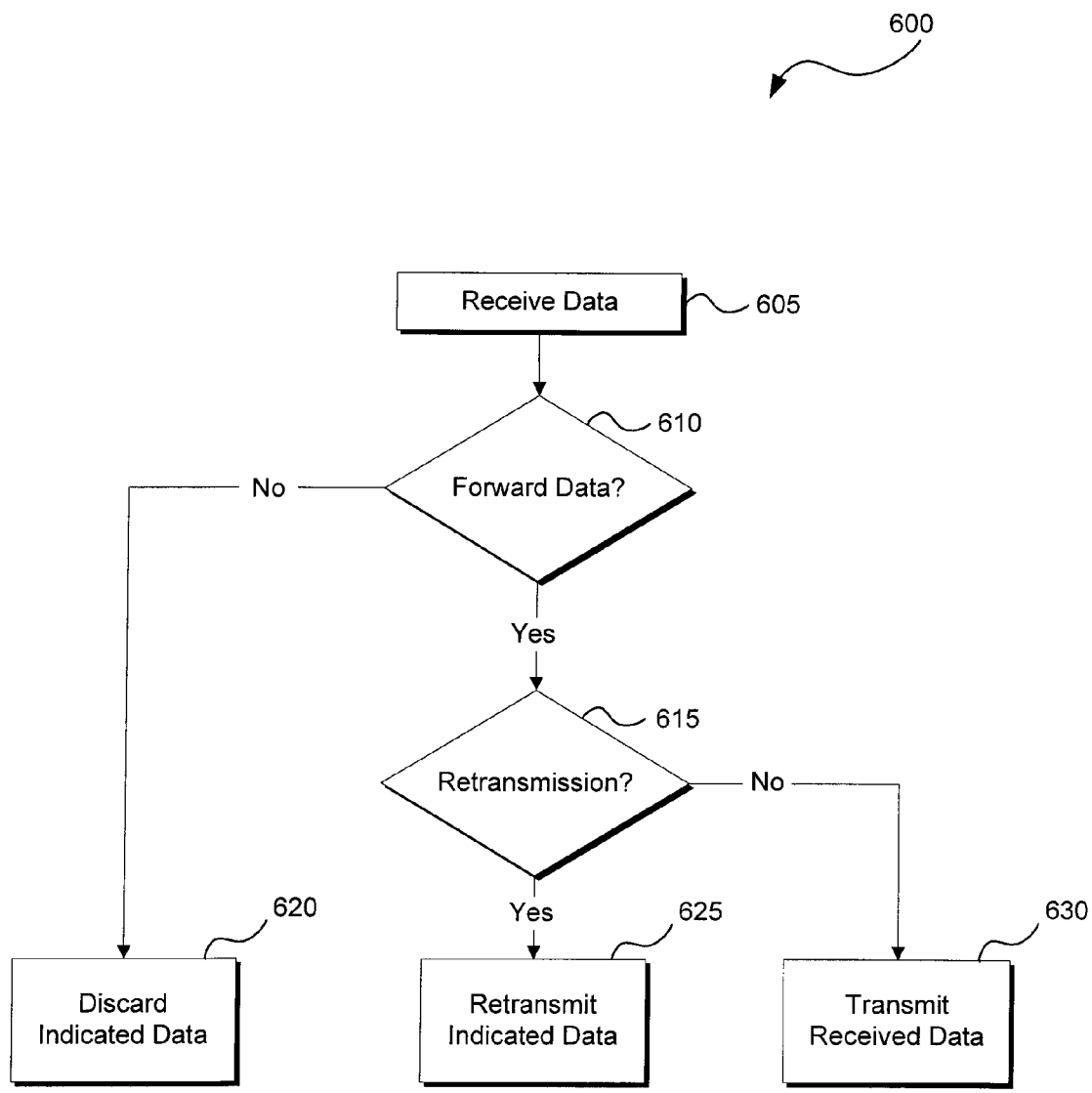
FIG. 6 is a flowchart illustrating an exemplary packet data processing, consistent with certain disclosed embodiments.

FIG. 6 discloses an exemplary flowchart 600 for data processing in a wireless communication system, such as exemplary wireless communication system 400, consistent with certain disclosed embodiments. Specifically, FIG. 6 illustrates the processing of packet data by any RS 440 received from a superordinate RS 440 or BS 430, and sent to a subordinate RS 440 or SS 450. As used herein, the terms "subordinate" and "superordinate" are used to describe the relative position of one node to another. A subordinate node is one that is positioned in the downlink stream between the node under discussion and a receiving node SS 450. A superordinate node is one that is positioned in the uplink stream between the node under discussion and BS 430.

As shown in FIG. 6, RS 440 may receive packet data from BS 430 or a superordinate RS 440 (step 605). Using control information, including packet data header information in the received packet data and/or MAP Information Element (IE) sent separately, RS 440 may determine if the received packet data is to be forwarded to a subordinate RS 440 or SS 450 (step 610). If the packet data is not to be forwarded to a subordinate RS 440 or SS 450 (step 610, No), RS 440 may process and discard the indicated packet data (step 620). In one exemplary embodiment, the indicated packet data may be packet data contained in the received data packets. Alternatively and/or additionally, the indicated packet data may be data sent in prior or subsequent data packets.

If, however, the packet data is to be forwarded to a subordinate RS 440 or SS 450 (step 610, Yes), RS 440 may determine if the received data includes one or more retransmitted data packets (step 615). Retransmitted data packets may refer to data packets that were previously transmitted to RS 440, but require retransmission due to transmission failure or error. Retransmitted packet data may be included in data packets containing new data, or may be sent in data packets including only the retransmitted data. In one exemplary embodiment, retransmitted packet data may be an indicator or identifier of data that was previously received by RS 440 and stored in a buffer of RS 440. RS 440 may use the resource allocation information previously sent by a control station, e.g., BS 430 or a superordinate RS 440, to determine if the packet data is a transmission or retransmission. Here, if a single data packet in the packet data is retransmitted data, RS 440 will determine that the received data includes a data retransmission.

If RS 440 determines that the received data includes one or more retransmitted data packets (step 615, Yes), RS 440 may retransmit the indicated packet data, along with any new data packets in the received data, to a subordinate RS 440 or SS 450 (step 625). In one exemplary embodiment, RS 440 may retrieve the packet data to be retransmitted from its buffer and retransmit the packet data using the resources allocated for the data retransmission. If the packet data is retransmission data, RS 440 may receive only control data from the superordinate BS 430 or RS 440. That is, the received data may contain only traffic and/or application data, and no user data. If the packet data does not include retransmission data (step 615, No), RS 440 may transmit the received packet data, including control information and/or user data, to a subordinate RS 440 or SS 450 (step 630).

Although not shown in FIG. 6, if RS 440 is configured with relay retransmission timers, upon transmission (step 630) and/or retransmission (step 625), RS 440 may set a relay retransmission timer with a value reflecting the total round-trip transmission time, $T_{total}$, between RS 440 and the destination node identified by the data.

Figure 7:
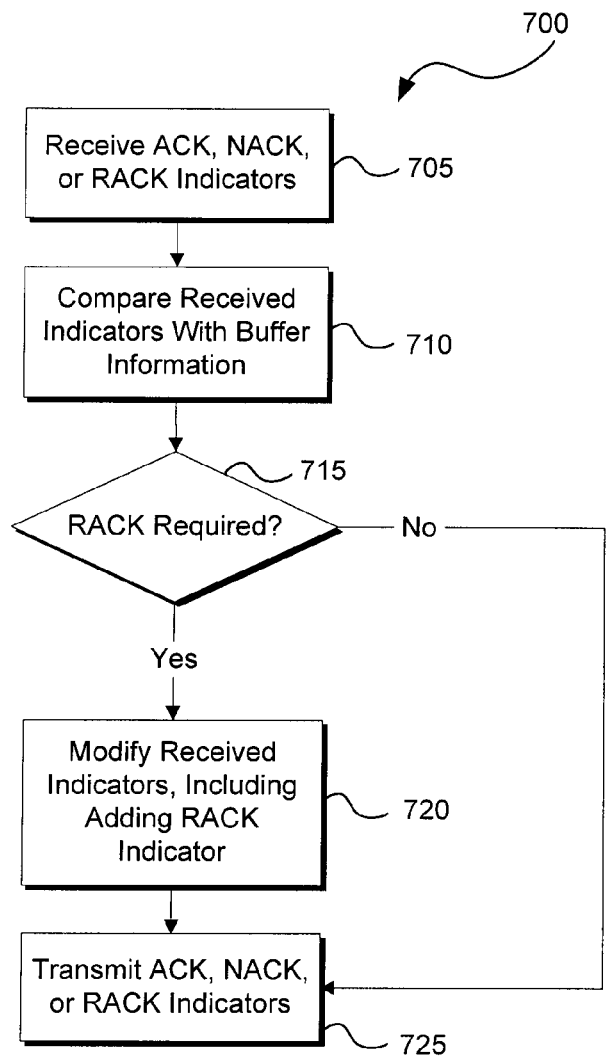
FIG. 7 is a flowchart illustrating an exemplary error detection and correction, consistent with certain disclosed embodiments.

FIG. 7 discloses an exemplary flowchart 700 for data processing in a wireless communication system, such as exemplary wireless communication system 400, consistent with certain disclosed embodiments. Specifically, FIG. 7 illustrates the processing of ACK, NACK, and/or RACK indicators that have been received from a subordinate RS 440 or SS 450 by RS 440 for transmission to a superordinate RS 440 or BS 430.

As shown in FIG. 7, RS 440 may receive indicators from a subordinate RS 440 or SS 450 (step 705). If the indicators are received from a subordinate RS 440, the indicators may include an ACK or NACK indicator and one or more RACK indicators. Alternatively, the indicator may include only an ACK or NACK indicator. As another alternative, the indicator may include only one or more RACK indicators. As used herein, the one or more RACK indicators may be used to identify the packet data successfully received by RS 440 from a superordinate BS 430 or RS 440 and transmitted to a subordinate RS 440 or SS 450. For example, if BS 430 sends 8 packets of data (e.g., data packets 1-8), but RS 440 receives only 6 data packets (e.g., data packets 1, 3, 4, 5, 6, and 8), a RACK indicator may be used to identify which of the 8 data packets were successfully received (e.g., data packets 1, 3, 4, 5, 6, and 8) and/or which of the 8 data packets was not successfully received (e.g., data packets 2 and 7). Identification of the packet data successfully received by RS 440 may be done directly and/or indirectly. That is, the ACK, NACK, and/or RACK indicators may, for example, identify the received packet data directly by identifying the received and/or unreceived packet data, or indirectly by providing information from which the identity of the successfully received packet data can be derived.

After receiving the ACK, NACK, and/or RACK indicators, RS 440 may compare the information contained in the ACK, NACK, and/or RACK indicators with buffer status information (step 710). In one exemplary embodiment, RS 440 may compare the ACK, NACK, and/or RACK indicator information with buffer information to identify the packet data received by the destination node. Based on the comparison, RS 440 may determine if a RACK indicator is required (step 715). If a RACK indicator is not required (step 715, No), RS 440 may transmit the received ACK, NACK, and/or RACK indicators to a superordinate RS 440 or BS 430.

If, however, a RACK indicator is required (step 715, Yes), RS 440 may modify the received indicators to include a RACK indicator (step 720). For example, RS 440 may include a RACK indicator with the received indicators. RS 440 may then transmit the ACK, NACK, and/or RACK indicators and included RACK indicator to a superordinate RS 440 or BS 430 (step 725). Alternatively and/or additionally, RS 440 may modify the header information to identify the packet data successfully received by RS 440 from a superordinate BS 430 or RS 440 and transmitted to a subordinate RS 440 or SS 450.

Figure 8:
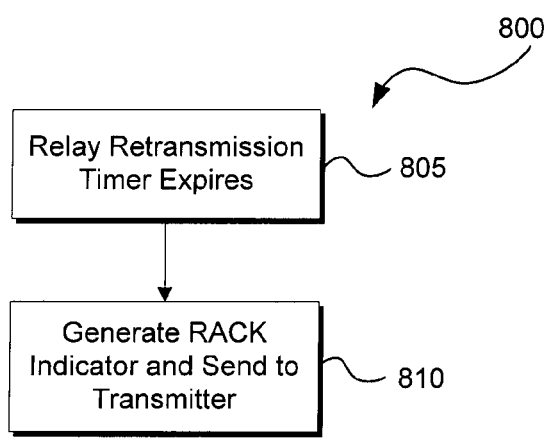
FIG. 8 is a flowchart illustrating an exemplary error detection and correction, consistent with certain disclosed embodiments.

FIG. 8 discloses an exemplary flowchart 800 for data processing in a wireless communication system, such as exemplary wireless communication system 400, consistent with certain disclosed embodiments. Specifically, FIG. 8 illustrates the generation of RACK indicators by RS 440 when ACK, NACK, and/or RACK indicators are not received by RS 440 before the expiration of an associated relay retransmission timer.

As shown in FIG. 8, if the relay retransmission timer expires before RS 440 receives ACK, NACK, and/or RACK indicators (step 805), RS 440 may automatically generate a RACK indicator, and send the generated RACK indicator to a superordinate RS 440 or BS 430 (step 810). When RS 440 automatically generates a RACK indicator without having received ACK, NACK, and/or RACK indicators from a subordinate RS 440 or SS 450, the generated indicator may not include an ACK or NACK indicator. Instead, the generated indicator will only include the RACK information for that RS 440.

Figure 9:
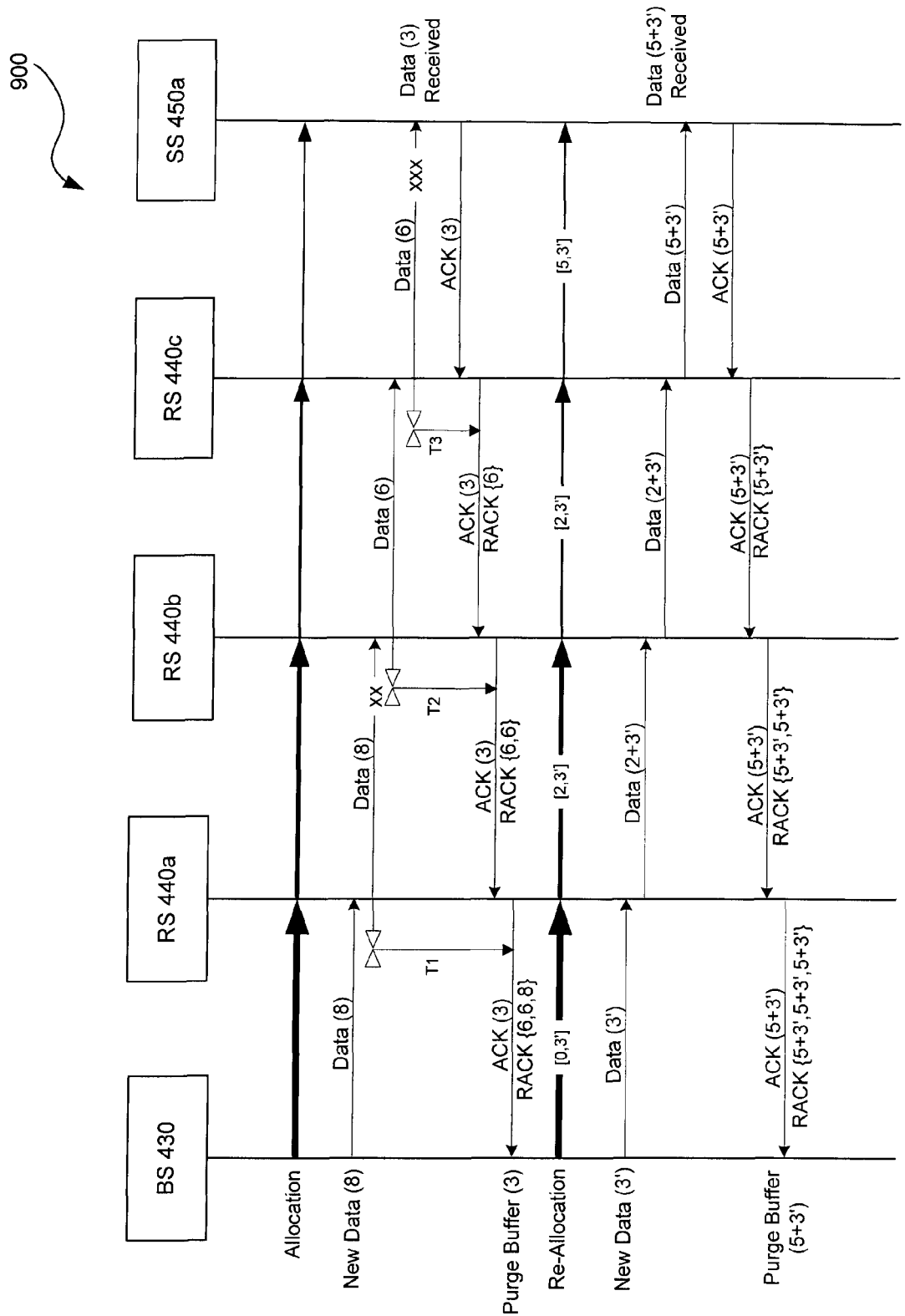
FIG. 9 is an exemplary signaling diagram, consistent with certain disclosed embodiments.

FIG. 9 is a signaling diagram 900 illustrating one exemplary embodiment of a transmission control mechanism, consistent with certain disclosed embodiments. Specifically, FIG. 9 discloses an implementation having RACK indicators included with an ACK or NACK indicator. In the implementation of FIG. 9, the disclosed relay retransmission timer does not expire before receiving ACK, NACK, and/or RACK indicators from a node in the downlink transmission path. In a system employing the signaling mechanisms illustrated by FIG. 9, resource allocation may be performed using distributed or centralized resource allocation.

As shown in FIG. 9, BS 430 may transmit control information to all nodes in a given transmission path, e.g., RS 440a, RS 440b, RS 440c, and SS 450a, to perform resource allocation (i.e., centralized resource allocation). After the resource allocation has been completed, BS 430 may send packet data to the destination node, e.g., SS 450a, via one or more intermediate nodes, e.g., RS 440a, RS 440b, and RS 440c. In addition, BS 430 may store a copy of the sent packet data in a buffer. In the example of FIG. 9, the packet data may consist of 8 data packets (i.e., Data (8)).

RS 440a may successfully receive the 8 packets of data, store a copy of the packet data in its buffer, and send the packet data to RS 440b. Concurrently with the transmission of the packet data to RS 440b, in one exemplary embodiment, RS 440a may set a relay retransmission timer $T_1$. As discussed above, the relay retransmission timer for each RS 440 may be set with a value reflecting the total round-trip time between that RS 440 and the destination node (e.g., SS 450a).

During transmission from RS 440a to RS 440b, 2 packets of data may be lost due to corruption, interference, error, etc., and RS 440*b* may receive only 6 packets of data. RS 440*b* may transmit the 6 packets of data to RS 440*c*, and store a copy of the transmitted packet data in its buffer. In one exemplary embodiment, RS 440*b* may set its relay retransmission timer $T_2$. Similarly, RS 440*c* may receive the 6 packets of data, and transmit the 6 packets of data to SS 450*a*. In addition, RS 440*c* may store a copy of the transmitted packet data in its buffer, and, if applicable, set its relay retransmission timer $T_3$. Between RS 440*c* and SS 450*a*, however, another 3 packets of data may be lost, resulting in only 3 packets of data being successfully received by SS 450*a*.

Upon receipt of the 3 packets of data, SS 450*a* may send an ACK indicator along the uplink transmission path to BS 430. As shown in FIG. 9, RS 440*c* may receive the ACK indicator before expiration of relay retransmission timer $T_3$. Further, as discussed above in connection with FIG. 6, RS 440*c* may compare the information included with the ACK indicator with the data previously stored in its buffer. Based on the comparison, RS 440*c* may generate a RACK indicator, include the RACK indicator with the ACK indicator, and forward the ACK and RACK indicators to its superordinate node, RS 440*b*. RS 440*b* may receive the ACK and included RACK indicator before expiration of relay retransmission timer $T_2$, and may compare the information included in the received ACK and/or RACK indicators with the data previously stored in its buffer. Based on the comparison, RS 440*b* may include its own RACK indicator with the ACK and RACK indicators to identify the data packets successfully received by RS 440*b*. RS 440*b* may forward the ACK and two RACK indicators to RS 440*a*. Similarly, RS 440*a* may receive the ACK and two RACK indicators before expiration of relay retransmission timer $T_1$, and compare the information included in the ACK and RACK indicators with the data previously stored in its buffer. Based on the comparison, RS 440*a* may include its own RACK indicator, and forward the ACK and three RACK indicators to BS 430.

Upon receipt of the ACK and/or RACK indicators, BS 430 may decode the ACK and/or RACK indicators to determine the transmission status of the packet data between each node of the transmission path. Based on the decoding, BS 430 may purge from its buffer the packet data successfully received by SS 450*a*. BS 430 may prepare new packet data to transmit to SS 450*a*, and re-allocate the resources along the transmission path accordingly. In scenarios employing centralized allocation of resources, BS 430 may communicate with each of RS 440*a*, RS 440*b*, and RS 440*c* to determine and allocate resources for the localized retransmission of data so that each RS 440 can receive the correct data from its most direct node in the uplink direction (i.e., superordinate node). In scenarios employing distributed resource allocation, each node (e.g., BS 430 and RS 440) along the transmission path may determine and allocate resources for the localized retransmission of data. In the example of FIG. 9 (centralized resource allocation), BS 430 may allocate 0 resources for data retransmission (Total−RACKed=8−8) and 3' resources for new data transmission along the first hop or segment (i.e., between BS 430 and RS 440*a*), 2 resources for data retransmission (Total−RACKed=8−6) and 3' resources for new data transmission in the second hop or segment (i.e., between RS 440*a* and RS 440*b*), 2 resources for data retransmission (Total−RACKed=8−6) and 3' for new data transmission in the third hop or segment (i.e., between RS 440*b* and RS 440*c*), and 5 resources for retransmission (Total−RACKed=8−3) and 3' for new data transmission in the fourth hop or segment (i.e., between RS 440*c* and SS 450*a*). Once the resources have been re-allocated, BS 430 may send the 3' new data packets to RS 440*a*.

RS 440*a* may retrieve the 2 data packets lost between RS 440*a* and RS 440*b* from its buffer, and add the 2 retransmission data packets to the new data for transmission to RS 440*b*, resulting in Data (2+3'). RS 440*b* may receive Data (2+3'), transmit Data (2+3') to RS 440*c*, and store the new data, Data (3'), in its buffer. Similarly, RS 440*c* may receive Data (2+3'), retrieve the 3 data packets lost between RS 440*c* and SS 450*a* from its buffer, and add the 3 retransmission data packets to the received data, i.e., Data (2+3'), resulting in Data (5+3'). RS 440*c* may then transmit Data (5+3') to SS 450*a*, and store a copy of the new data, Data (3') in its purge buffer. SS 450*a* may receive both the new and retransmitted data (i.e., Data (5+3')), and transmit an ACK indicator to BS 430 via RS 440*c*, RS 440*b*, and RS 440*a*. The transmitted ACK indicator may acknowledge receipt of 8 packets of data (i.e., ACK (5+3')), with 3 packets being new data and 5 packets being retransmitted data. Upon receipt of the ACK indicator, BS 430 may purge its buffer of both the new and old data.

Although FIG. 9 illustrates the transmission of an ACK indicator from SS 450*a*, SS 450*a* may alternatively send a NACK indicator. In either case, error detection and correction will proceed as discussed above. Further, while signaling diagram 900 illustrates the implementation of an exemplary embodiment using three RSs 440 in a single transmission path, it is anticipated that the number of RSs 440 in a transmission path may be greater or fewer than that illustrated. In addition, although FIG. 9 illustrates the use of relay retransmission timers during transmission of new data, relay retransmission timers may also be used during retransmission of data.

Figure 10:
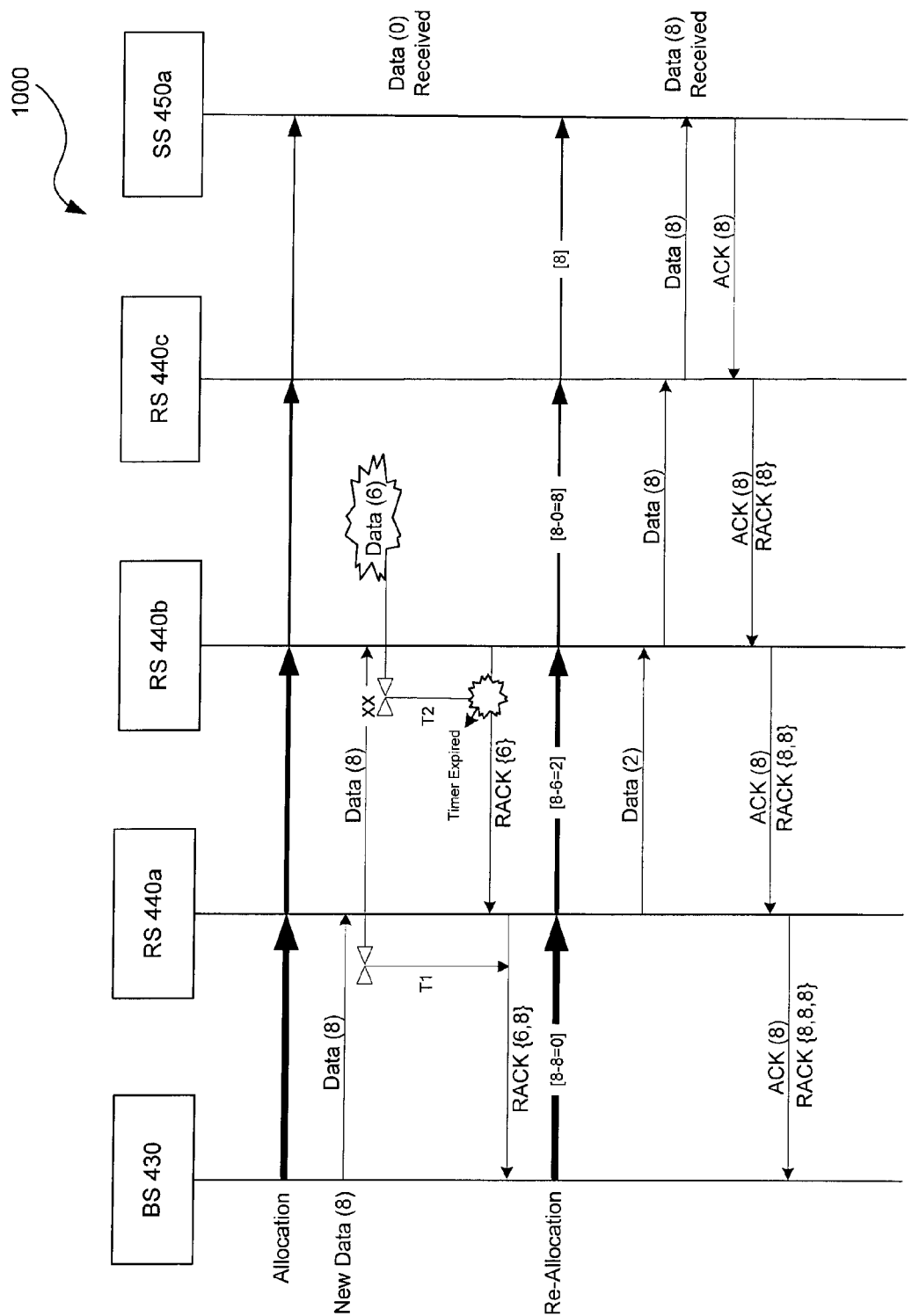
FIG. 10 is an exemplary signaling diagram, consistent with certain disclosed embodiments.

FIG. 10 is a signaling diagram 1000 illustrating an exemplary embodiment of a transmission control mechanism, consistent with certain disclosed embodiments. Specifically, FIG. 10 discloses an implementation in which an RS 440 relay retransmission timer expires without receiving ACK, NACK, and/or RACK indicators from a subordinate node in the transmission path.

In a system employing the signaling mechanisms illustrated by FIG. 10, resource allocation may be performed using either distributed or centralized resource allocation. For example, as shown in FIG. 10, BS 430 may transmit control information to all nodes in a given transmission path, e.g., RS 440*a*, RS 440*b*, RS 440*c*, and SS 450*a*, to perform resource allocation (i.e., centralized resource allocation). Although not shown, resource allocation may also be done by a superordinate node in the transmission path (e.g., distributed resource allocation).

After the resource allocation has been completed, BS 430 may send packet data to the destination node, e.g., SS 450*a*, via one or more intermediate nodes, e.g., RS 440*a*, RS 440*b*, and RS 440*c*. In addition, BS 430 may store a copy of the sent packet data in a buffer. In the example of FIG. 10, the packet data may consist of 8 data packets (i.e., Data (8)). RS 440*a* may successfully receive the 8 packets of data, store a copy of the packet data in its buffer, and send the packet data to RS 440*b*. Concurrently with the transmission of the packet data to RS 440*b*, in one exemplary embodiment, RS 440*a* may set a relay retransmission timer $T_1$. As discussed above, the relay retransmission timer for each RS 440 may be set with a value reflecting the total round-trip time between that RS 440 (e.g., RS 440*a*) and the destination node (e.g., SS 450*a*).

During transmission from RS 440*a* to RS 440*b*, 2 packets of data may be lost due to corruption, interference, error, etc., and RS 440*b* may receive only 6 packets of data. RS 440*b* may transmit the 6 packets of data to RS 440*c*, and store a copy of the transmitted data in its buffer. In one exemplary embodiment, RS 440*b* may set its relay retransmission timer $T_2$. In the example of FIG. 10, however, the 6 packets of data may be lost between RS 440b and RS 440c. Thus, RS 440c and SS 450a may not receive data, and will not perform any actions. As a result, neither RS 440c or SS 450a will prepare or send ACK, NACK, and/or RACK indicators along the uplink transmission path toward BS 430. Therefore, as discussed above in connection with FIG. 8, relay retransmission timer $T_2$, of RS 440b will expire without having received ACK, NACK, and/or RACK indicators from either of subordinate nodes RS 440c or SS 450a.

Once relay retransmission timer $T_2$ expires, RS 440b may generate and send a RACK indicator along the uplink transmission path to RS 440a. The RACK indicator generated by RS 440b will reflect that 6 packets of data were successfully received by RS 440b from RS 440a. However, because no ACK, NACK, and/or RACK indicators were received by RS 440b, the RACK indicator generated by RS 440b will not be included with one or more other indicators. RS 440a may receive the RACK indicator before expiration of relay retransmission timer $T_1$, and compare the information included in the RACK indicator with the data previously stored in its buffer. Based on the comparison, RS 440a may include its own RACK indicator, and forward the two RACK indicators to BS 430.

Upon receipt of the RACK indicators, BS 430 may decode the RACK indicators to determine the transmission status of the packet data between each node of the transmission path. In this exemplary embodiment, BS 430 will be able to determine that RS 440a received 8 data packets and RS 440b received 6 data packets. In addition, BS 430 will be able to determine that RS 440c and SS 450a received no data packets. Therefore, based on the decoding, BS 430 will know not to purge any data from its buffer and not to send new data. Instead, the resources along the transmission path will be re-allocated to retransmit the lost packet data. In some scenarios, BS 430 may re-allocate resources along the transmission path by communicating with each of RS 440a, RS 440b, and RS 440c to determine the localized retransmission of data so that each RS 440 can receive the correct data from its most direct node in the uplink direction (i.e., centralized resource allocation). In other scenarios, each node along the transmission path will determine the re-allocation of resources between itself and the next node in the transmission path (i.e., distributed resource allocation).

In the example of FIG. 10, BS 430 may allocate 0 resources for data retransmission (Total−RACKed=8−8) along the first hop or segment (i.e., between BS 430 and RS 440a), 2 resources for data retransmission (Total−RACKed=8−6) along the second hop or segment (i.e., between RS 440a and RS 440b), 8 resources for data retransmission (Total−RACKed=8−0) along the third hop or segment (i.e., between RS 440b and RS 440c), and 8 resources for data retransmission (Total−RACKed=8−0) along the fourth hop or segment (i.e., between RS 440c and SS 450a). Once the resources have been re-allocated, BS 430 may initiate retransmission of the packet data.

RS 440a may retrieve the 2 data packets lost between RS 440a and RS 440b from its buffer, and transmit the 2 retransmission data packets to RS 440b (i.e., Data (2)). RS 440b may receive Data (2), and add the 6 data packets lost between RS 440b and RS 440c. RS 440b may then transmit Data (8) to RS 440c. Similarly, RS 440c may receive Data (8), store a copy of the data packets in its buffer, and forward the 8 data packets to SS 450a.

SS 450a may receive the retransmitted data (i.e., Data (8)), and transmit an ACK indicator to BS 430 via RS 440c, RS 440b, and RS 440a. As shown in FIG. 10, RS 440c may receive the ACK indicator, and compare the information included in the ACK indicator with the data previously stored in its buffer. Based on the comparison, RS 440c may generate a RACK indicator, include the generated RACK indicator with the ACK indicator, and forward the ACK and RACK indicators to its superordinate node, RS 440b. RS 440b may receive the ACK indicator and included RACK indicator, and compare the information included in the ACK and/or RACK indicators with the data previously stored in its buffer. Based on the comparison, RS 440b may include its own RACK indicator with the ACK and RACK indicators to identify the data packets successfully received by RS 440b. RS 440b may forward the ACK and two RACK indicators to RS 440a. Similarly, RS 440a may receive the ACK and two RACK indicators, and compare the information included in the ACK and RACK indicators with the data previously stored in its buffer. Based on the comparison, RS 440a may include its own RACK indicator, and forward the ACK and three RACK indicators to BS 430.

Upon receipt of the ACK and RACK indicators, BS 430 may decode the ACK and RACK indicators to determine the transmission status of the packet data between each node of the transmission path. Based on the decoding, BS 430 may purge the packet data successfully received by SS 450a from its buffer, and prepare new packet data to transmit to SS 450a. In a system using centralized resource allocation, BS 430 may re-allocate the resources along the transmission path. Alternatively, in a system using distributed resource allocation, each superordinate node (e.g., BS 430 or RSs 440) in the transmission path may re-allocate resources between itself and the next node along the transmission path.

Although FIG. 10 discloses the transmission of an ACK indicator from SS 450a, it is anticipated that SS 450a may instead send a NACK indicator. In either case, error detection and correction will proceed as discussed above. Further, while signaling diagram 1000 illustrates the implementation of an exemplary embodiment using three RSs 440 in a single transmission path, it is anticipated that the number of RSs 440 in a transmission path may be greater or fewer than that illustrated. In addition, although FIG. 10 illustrates the use of relay retransmission timers during transmission of new data, relay retransmission timers may also be used during retransmission of data.

Figure 11:
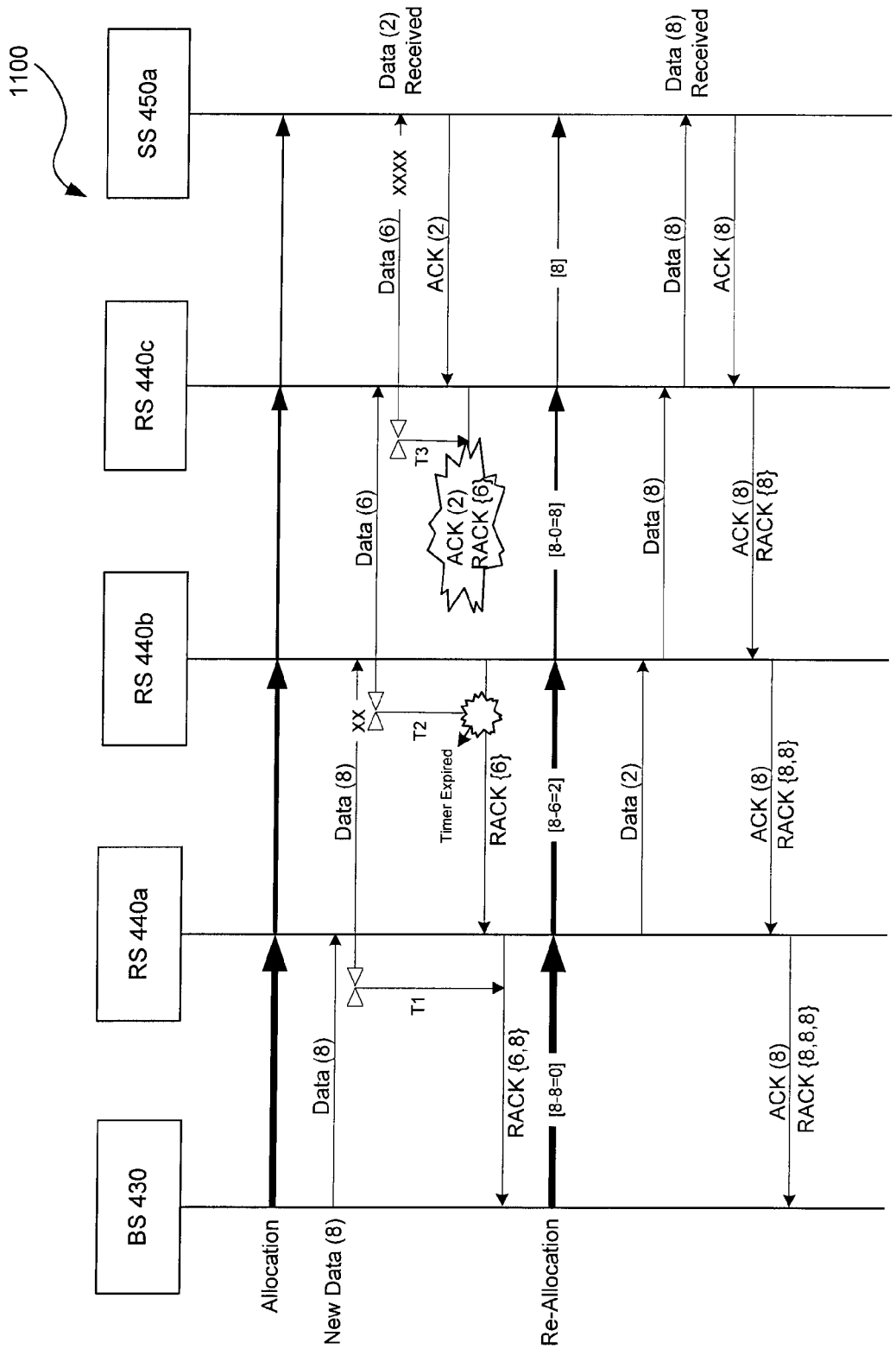
FIG. 11 is an exemplary signaling diagram, consistent with certain disclosed embodiments.

FIG. 11 is a signaling diagram 1100 illustrating an exemplary embodiment of a transmission control mechanism, consistent with certain disclosed embodiments. Specifically, FIG. 1 discloses an implementation in which the ACK and RACK indicators are lost along the uplink transmission path (i.e., transmission path from SS 450a to BS 430). Thus, in FIG. 11, an RS 440 relay retransmission timer expires without receiving ACK, NACK, and/or RACK indicators from its subordinate node in the transmission path.

Figure 1:
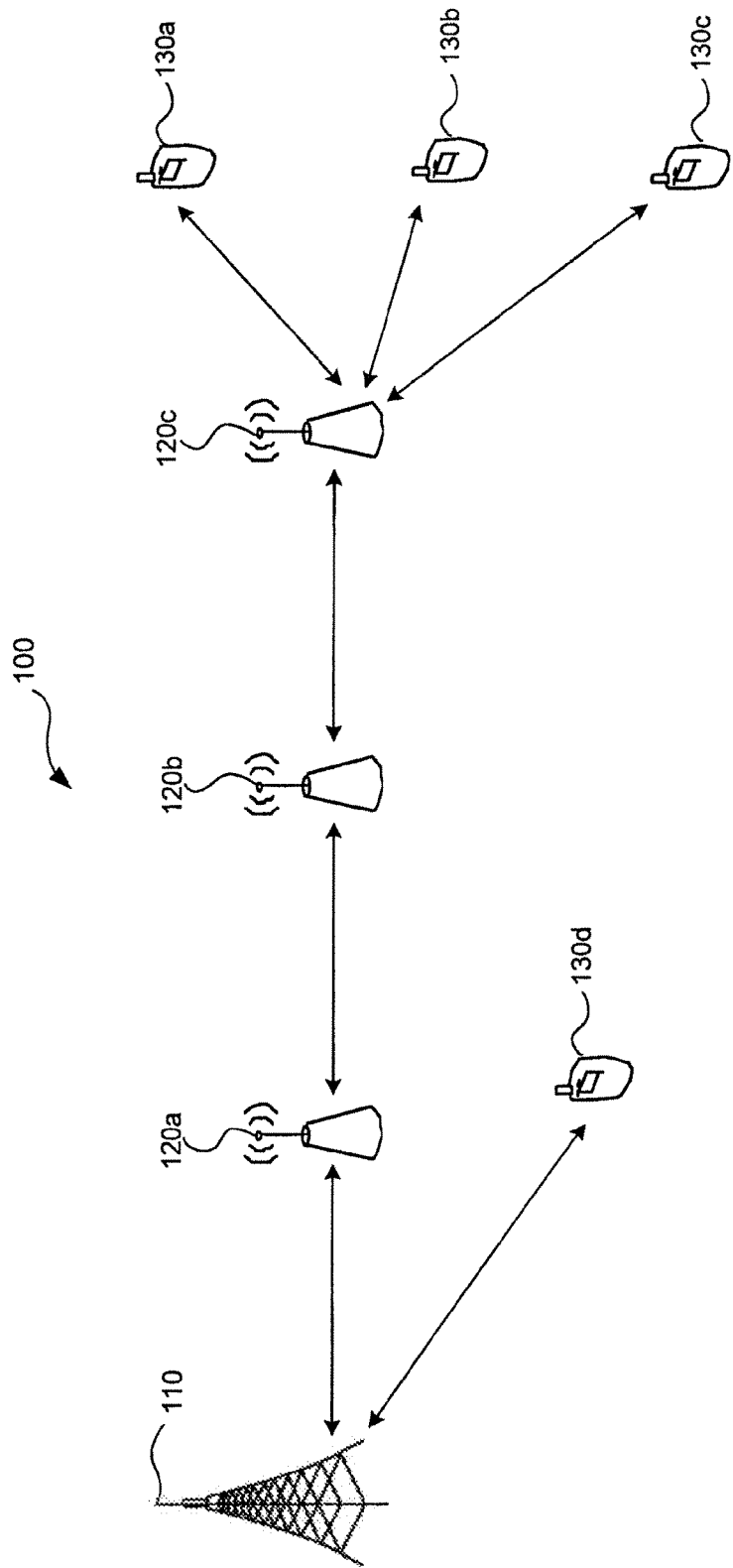
FIG. 1 is a block diagram for a prior art wireless communication system.
Figure 2:
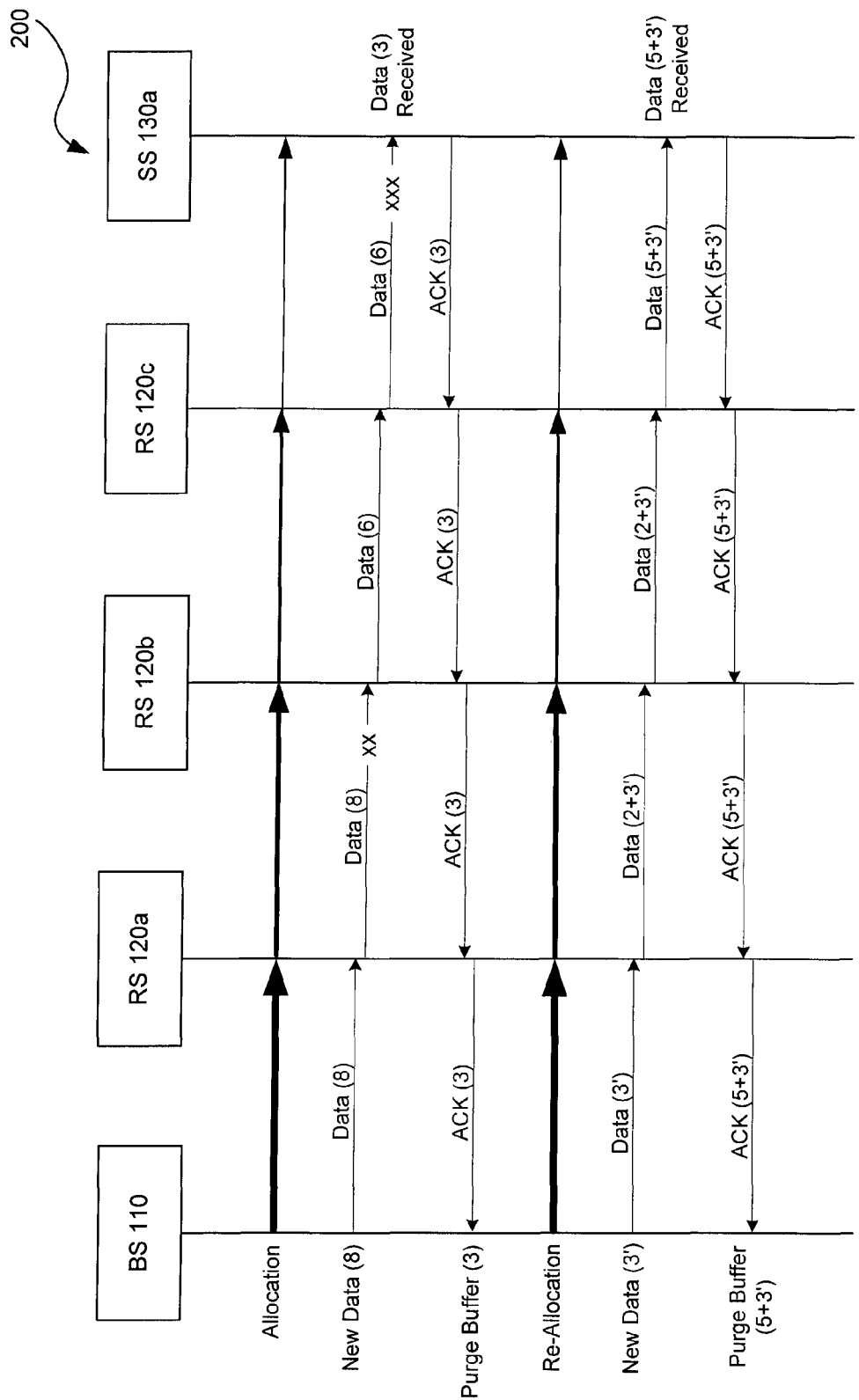
FIG. 2 is a signaling diagram for a prior art wireless communication system using end-to-end ACK messaging.
Figure 3A:
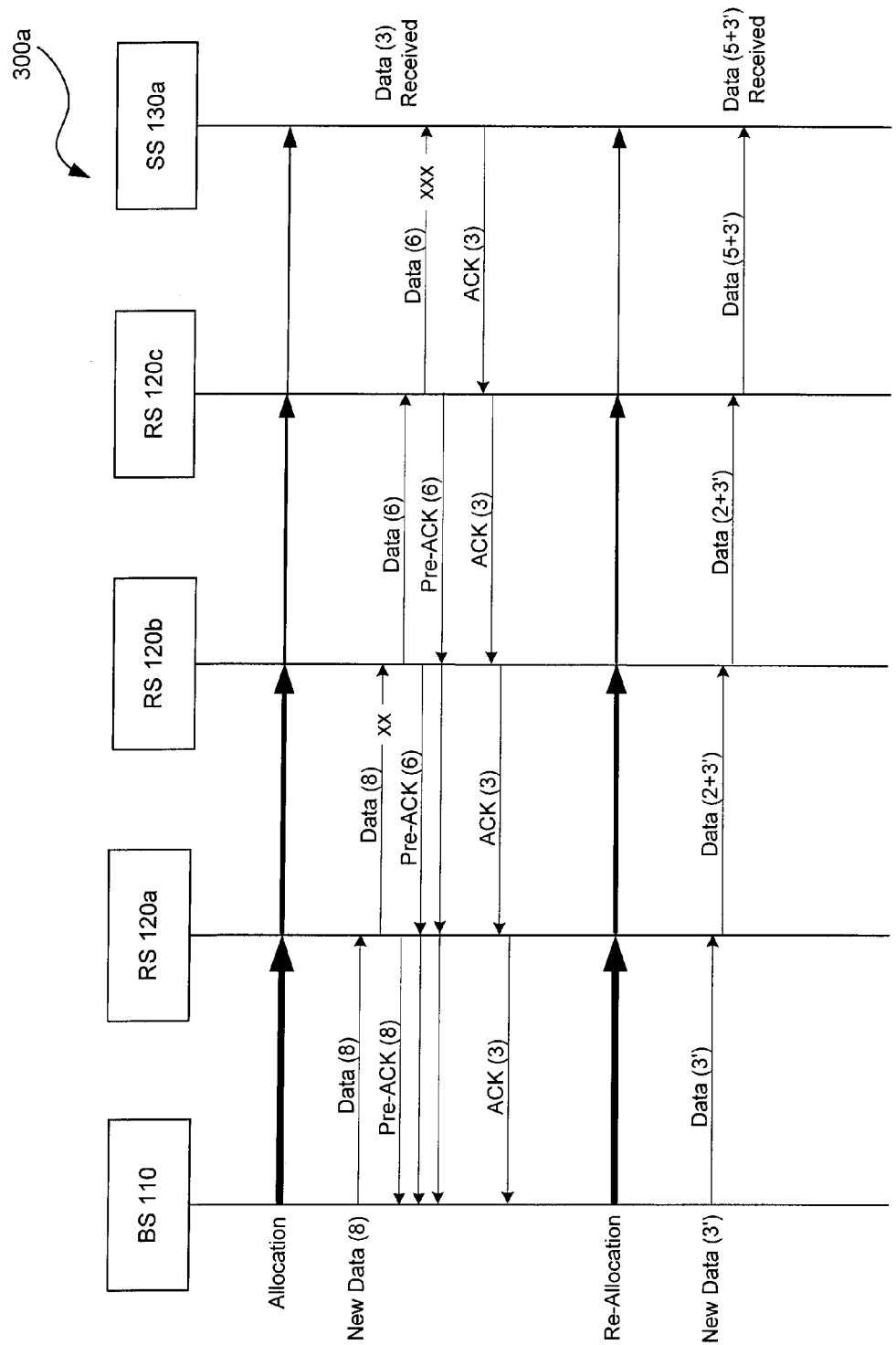
FIG. 3a is a signaling diagram for a prior art wireless communication system using pre-ACK or per-hop ACK messaging.
Figure 3B:
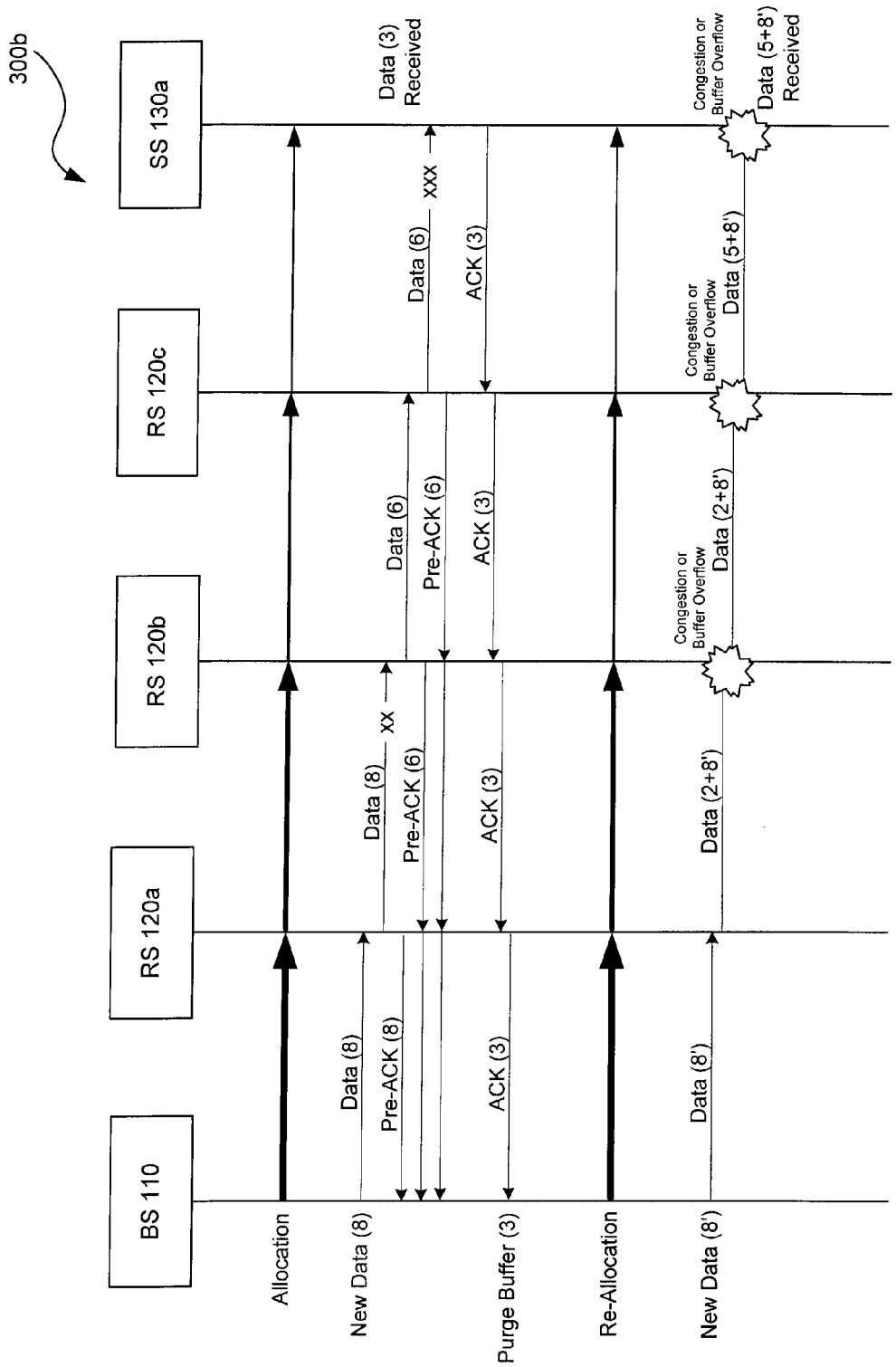
FIG. 3b is a signaling diagram for a prior art wireless communication system using pre-ACK or per-hop ACK messaging.

In a system employing the signaling mechanisms illustrated by FIG. 1, resource allocation may be performed using either distributed or centralized resource allocation. As shown in FIG. 11, BS 430 may transmit control information to all nodes in a given transmission path, e.g., RS 440a, RS 440b, RS 440c, and SS 450a, to perform resource allocation (i.e., centralized resource allocation). Although not shown, resource allocation may also be done by a superordinate node in the transmission path (e.g., distributed resource allocation).

After the resource allocation has been completed, BS 430 may send packet data to the destination node, e.g., SS 450a, via one or more intermediate nodes, e.g., RS 440a, RS 440b, and RS 440c. In addition, BS 430 may store a copy of the sent packet data in a buffer. In the example of FIG. 1, the packet data may consist of 8 data packets, i.e., Data (8). RS 440*a* may successfully receive the 8 packets of data, store a copy of the packet data in its buffer, and send the packet data to RS 440*b*. Concurrently with the transmission of the packet data to RS 440*b*, in one exemplary embodiment, RS 440*a* may set a relay retransmission timer $T_1$. As discussed above, the relay retransmission timer for each RS 440 may be set with a value reflecting the total round-trip time between that RS 440 and the destination node, e.g., SS 450*a*.

During transmission from RS 440*a* to RS 440*b*, 2 packets of data may be lost due to corruption, interference, error, etc., and RS 440*b* may receive only 6 packets of data. RS 440*b* may transmit the 6 packets of data to RS 440*c*, and store a copy of the transmitted data in its buffer. In one exemplary embodiment, RS 440*b* may set its relay retransmission timer $T_2$. Similarly, RS 440*c* may receive the 6 packets of data, and transmit the 6 packets of data to SS 450*a*. In addition, RS 440*c* may store a copy of the transmitted data in its buffer, and, if applicable, set its relay retransmission timer $T_3$. Between RS 440*c* and SS 450*a*, however, another 4 packets of data may be lost, resulting in only 2 packets of data being successfully received by SS 450*a*.

Upon receipt of the 2 packets of data, SS 450*a* may send an ACK indicator along the uplink transmission path to BS 430. As shown in FIG. 11, RS 440*c* may receive the ACK indicator before expiration of relay retransmission timer $T_3$. Further, as discussed above in connection with FIG. 6, RS 440*c* may compare the information included with the ACK indicator with the data previously stored in its buffer. Based on the comparison, RS 440*c* may generate a RACK indicator, include the RACK indicator with the ACK indicator, and forward the ACK indicator and included RACK indicator to its superordinate node RS 440*b*.

In the example of FIG. 11, however, RS 440*b* may not receive the ACK indicator and included RACK indicator before expiration of relay retransmission timer $T_2$. The loss of the ACK indicator and included RACK indicator may occur due to corruption, error, interference, etc. Therefore, as discussed above in connection with FIG. 8, relay retransmission timer $T_2$ of RS 440*b* will expire without having received ACK, NACK, and/or RACK indicators from either of subordinate nodes RS 440*c* or SS 450*a*.

Once relay retransmission timer T2 expires, RS 440*b* may generate and send a RACK indicator along the uplink transmission path to RS 440*a*. The RACK indicator generated by RS 440*b* will reflect that 6 packets of data were successfully received by RS 440*b* from RS 440*a*. However, because no ACK, NACK, or RACK indicators were received by RS 440*b*, the RACK indicator generated by RS 440*b* will not be included with another ACK, NACK, or RACK indicator.

Similarly, RS 440*a* may receive the RACK indicator before expiration of relay retransmission timer $T_1$, and compare the information included in the RACK indicator with the data previously stored in its buffer. Based on the comparison, RS 440*a* may include its own RACK indicator, and forward the two RACK indicators to BS 430.

Upon receipt of the RACK indicators, BS 430 may decode the RACK indicators to determine the transmission status of the packet data between each node of the transmission path. In this exemplary embodiment, BS 430 will be able to determine that RS 440*a* received 8 data packets and RS 440*b* received 6 data packets. However, while RS 440*c* and SS 450*a* received a subset of the data packets, BS 440*c* will be not able to determine if RS 440*c* and SS 450*a* successfully received any data packets. Therefore, based on the decoding, BS 430 will not purge data from its buffer and send new data. Instead, resources along the transmission path may be re-allocated to allow for retransmission of the lost packet data or data that was not acknowledged to be successfully received. In some scenarios, BS 430 may communicate with each of RS 440*a*, RS 440*b*, and RS 440*c* to determine the localized retransmission of data so that each RS 440 can receive the correct data from its most direct node in the uplink direction (i.e., superordinate node), and BS 110 may then re-allocate the resources along the transmission path (i.e., centralized resource allocation). In other scenarios, each superordinate node along the transmission path may re-allocate resources between itself and the next node along the transmission path (i.e., distributed resource allocation).

In the example of FIG. 11, BS 430 may allocate 0 resources for data retransmission (Total−RACKed=8−8) along the first hop or segment (i.e., between BS 430 and RS 440*a*), 2 resources for data retransmission (Total−RACKed=8−6) along the second hop or segment (i.e., between RS 440*a* and RS 440*b*), 8 resources for data retransmission (Total−RACKed=8−0) along the third hop or segment (i.e., between RS 440*b* and RS 440*c*), and 8 resources for retransmission (Total−RACKed=8−0) along the fourth hop or segment (i.e., between RS 440*c* and SS 450*a*). Once the resources have been re-allocated, BS 430 may initiate retransmission of the packet data.

RS 440*a* may retrieve the 2 data packets lost between RS 440*a* and RS 440*b* from its buffer, and transmit the 2 retransmission data packets to RS 440*b* (i.e., Data (2)). RS 440*b* may receive Data (2), and add the 6 data packets lost between RS 440*b* and RS 440*c*. RS 440*b* may then transmit Data (8) to RS 440*c*. Similarly, RS 440*c* may receive Data (8), store a copy of the data packets in its buffer, and forward the 8 data packets to SS 450*a*.

SS 450*a* may receive the retransmitted data (i.e., Data (8)), and transmit an ACK indicator to BS 430 via RS 440*c*, RS 440*b*, and RS 440*a*. As shown in FIG. 11, RS 440*c* may receive the ACK indicator, and compare the information included in the ACK indicator with the data previously stored in its buffer. Based on the comparison, RS 440*c* may generate a RACK indicator, include the generated RACK indicator with the ACK indicator, and forward the ACK and RACK indicators to its superordinate node, RS 440*b*. RS 440*b* may receive the ACK indicator and included RACK indicator, and compare the information included in the ACK and/or RACK indicators with the data previously stored in its buffer. Based on the comparison, RS 440*b* may include its own generated RACK indicator with the ACK and RACK indicators to identify the data packets successfully received by RS 440*b*. RS 440*b* may forward the ACK and two RACK indicators to RS 440*a*. Similarly, RS 440*a* may receive the ACK and two RACK indicators, and compare the information included in the ACK and RACK indicators with the data previously stored in its buffer. Based on the comparison, RS 440*a* may include its own generated RACK indicator, and forward the ACK and three RACK indicators to BS 430.

Upon receipt of the ACK and RACK indicators, BS 430 may decode the ACK and RACK indicators to determine the transmission status of the packet data between each node of the transmission path. Based on the decoding, BS 430 may purge the packet data successfully received by SS 450*a* from its buffer. BS 430 may prepare new packet data to transmit to SS 450*a*, and the resources along the transmission path may be re-allocated accordingly.

Although FIG. 11 discloses the transmission of an ACK indicator from SS 450*a*, SS 450*a* may alternatively send a NACK indicator. In either case, error detection and correction will proceed as discussed above. Further, while signaling diagram 1100 illustrates the implementation of an exemplary embodiment using three RSs 440 in a single transmission path, it is anticipated that the number of RSs 440 in a transmission path may be greater or fewer than that illustrated. In addition, although FIG. 11 illustrates the use of relay retransmission timers during transmission of new data, relay retransmission timers may also be used during retransmission of data.

Figure 12:
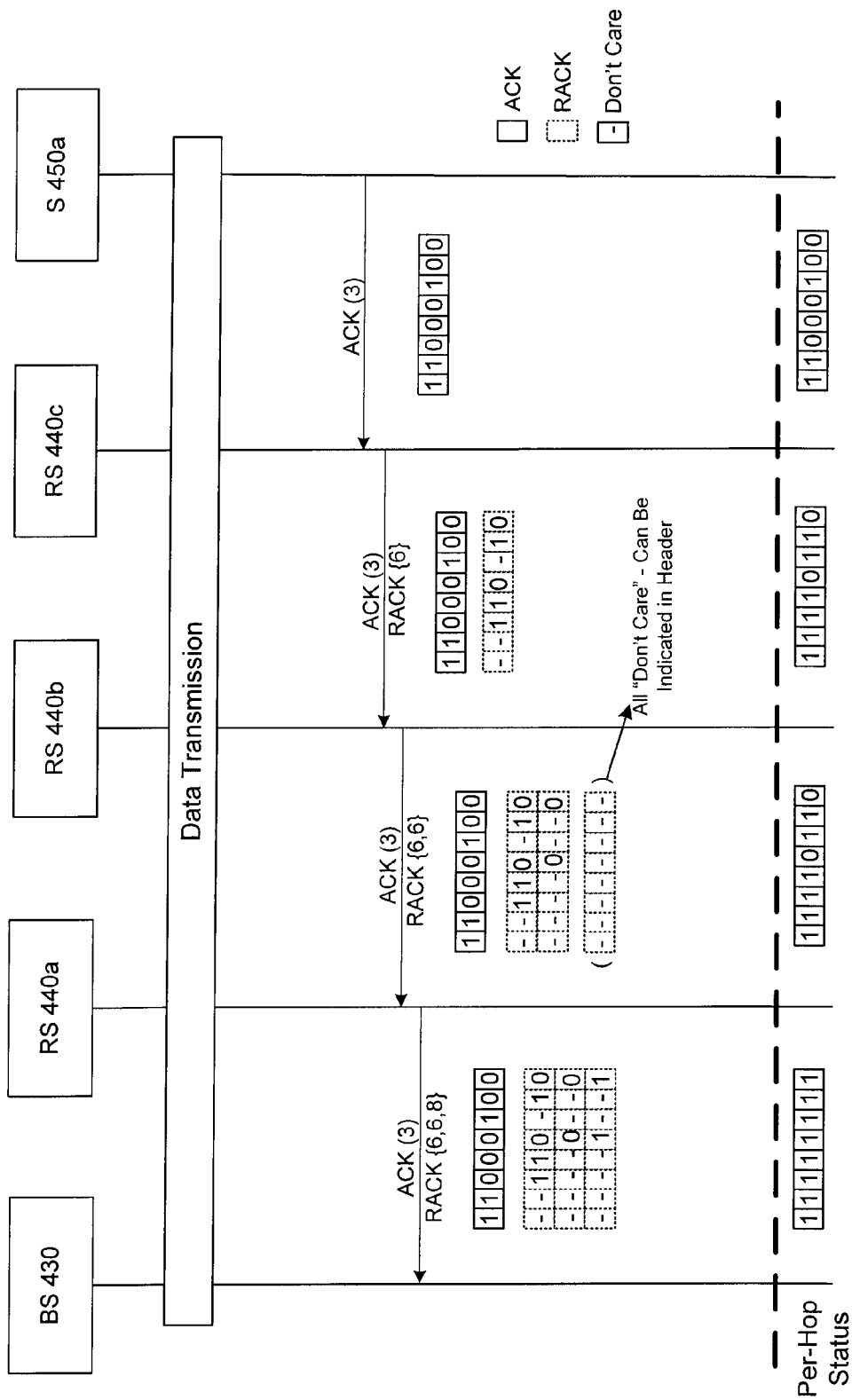
FIG. 12 is an exemplary signaling diagram illustrating an ACK indicator with RACK indicators, consistent with certain disclosed embodiments.

FIG. 12 is a signaling diagram illustrating exemplary ACK and RACK indicators, consistent with certain disclosed embodiments. To illustrate the ACK and RACK indicators, FIG. 12 uses the example of FIG. 9. That is, BS 430 sends 8 data packets to RS 440*a*, RS 440*a* successfully receives and sends 8 data packets to RS 440*b*, RS 440*b* successfully receives and sends the 6 data packets to RS 440*c*, and RS 440*c* successfully receives and sends the 6 data packets to SS 450*a*. However, SS 450*a* successfully receives only 3 data packets, and therefore prepares and sends an ACK indicator acknowledging successful receipt of 3 data packets.

As shown in FIG. 12, the ACK indicator generated by SS 450*a* may include 8 data regions by which SS 450*a* can identify the 3 data packets successfully received. While the example of FIG. 12 uses data regions of a single bit, the data regions can be of any size or configuration. As shown in FIG. 12, SS 450 may generate an ACK indicator having a bit stream of "11000100." SS 450*a* may send the generated ACK indicator to RS 440*c*.

RS 440*c* may compare the information provided by the ACK indicator, i.e., the identity of the data packets successfully received by SS 450*a*, and compare the data packets successfully received by RS 440*c* with the data packets indicated as successfully received by SS 450*a* in the ACK indicator. RS 440*c* may generate a RACK indicator identifying the data packets successfully received by RS 440*c* but not reported in the ACK indicator. For the data successfully received by RS 440*c* and reported in the received ACK indicator, RS 440*c* may insert a "don't care" or "no additional information" indicator, e.g., "-", and include the generated RACK indicator with the received ACK indicator. As shown in FIG. 12, the RACK indicator generated by RS 440*c* may be "--110-10," and the bit stream of the ACK and RACK indicators would be "11000100" followed by "--110-10." In some embodiments, the addition of the RACK indicator to the ACK indicator may be indicated in the control part of the message, using, for example, a bit in the message header. RS 440*c* may send the ACK and included RACK indicator to RS 440*b*.

RS 440*b* may compare the information provided by the ACK indicator and included RACK indicator, i.e., the identity of the data packets successfully received by SS 450*a* and RS 440*c*, and compare the data successfully received by RS 440*b* with the data packets indicated as successfully received by SS 450*a* in the ACK indicator and RS 440*c* in the RACK indicator. RS 440*b* may generate a RACK indicator identifying the data packets successfully received by RS 440*b* but not reported in the ACK and/or RACK indicators. For the data successfully received by RS 440*b* and reported in the ACK and/or RACK indicators, RS 440*b* may insert a "don't care" or "no additional information" indicator, e.g., "–", and include the generated RACK indicator with the received ACK and RACK indicators. As shown in FIG. 12, the RACK indicator generated by RS 440*b* may be "----0--0," and the bit stream of the ACK and RACK indicators would be "11000100" followed by "--110-10" and "----0--0." As discussed above, in some embodiments, the addition of the RACK indicators to the ACK indicator may be indicated in the control part of the message, using, for example, a bit in the message header. In this example, RS 440*b* may indicate in the message header that all the bits for this RACK are "don't care." RS 440*b* may send the ACK indicator and included RACK indicators to RS 440*a*.

RS 440*a* may compare the information provided by the ACK and included RACK indicators, i.e., the identity of the data packets successfully received by SS 450*a*, RS 440*c* and RS 440*b*, and compare the data successfully received by RS 440*a* with the data packets indicated as successfully received by SS 450*a* in the ACK indicator and RS 440*c* and RS 440*b* in the RACK indicators. Based on the comparison, RS 440*a* may generate a RACK indicator identifying the data packets successfully received by RS 440*a* but not reported in the ACK and/or RACK indicators. For the data successfully received by RS 440*a* and reported in the ACK and/or RACK indicators, RS 440*a* may insert a "don't care" or "no additional information" indicator, e.g., "-", and include the generated RACK indicator with the received ACK and RACK indicators. As shown in FIG. 12, the RACK indicator generated by RS 440*a* may be "----1---10," and the bit stream of the ACK and RACK indicators would be "11000100" followed by "--110-10," "----0--0," and "----1--1." RS 440*a* may send the ACK and included RACK indicators to BS 430.

Figure 13:
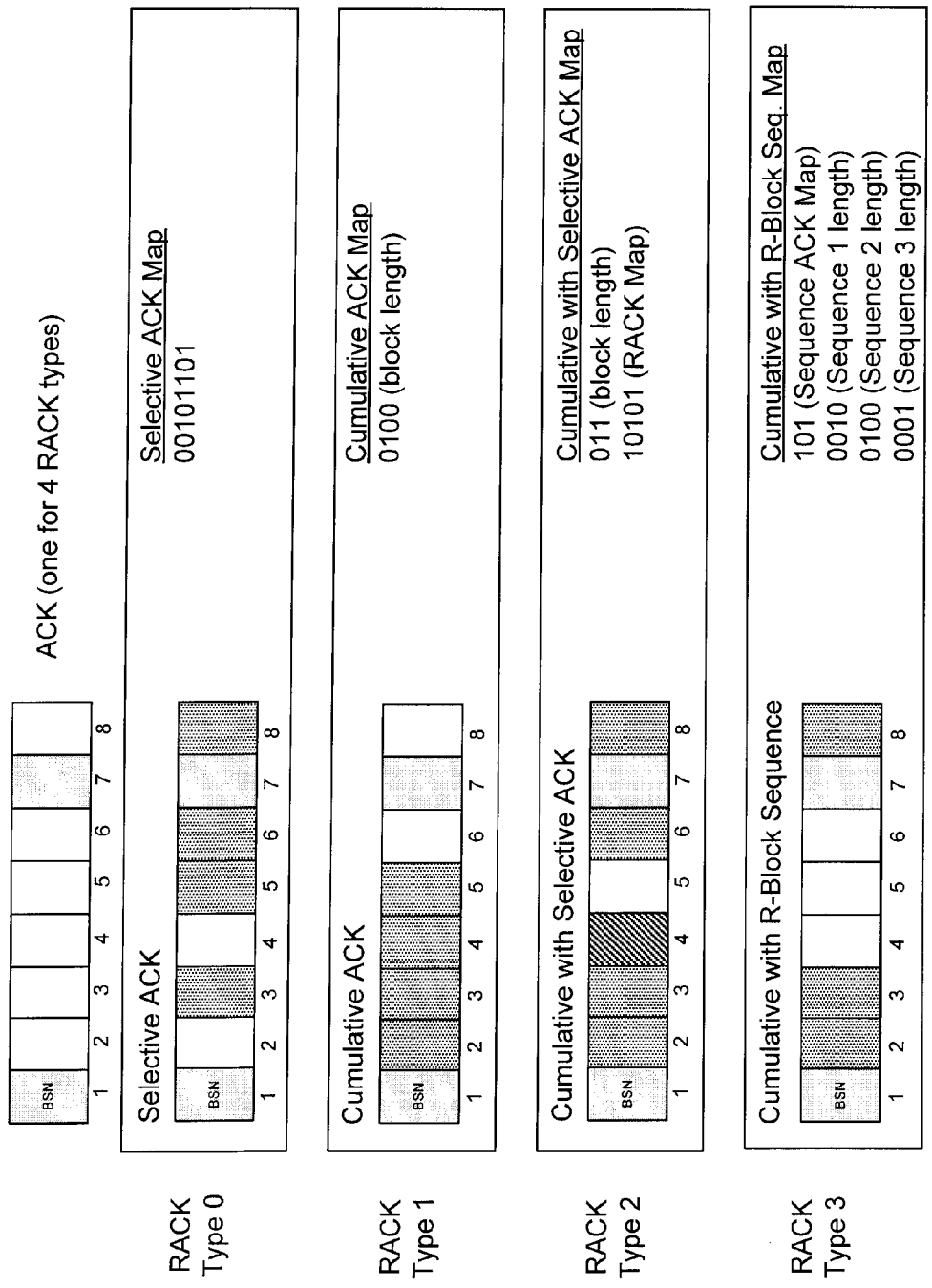
FIG. 13 is an exemplary block diagram illustrating RACK indicator types, consistent with certain disclosed embodiments.

FIG. 13 is a diagram illustrating the different RACK indicator types. As shown in FIG. 13, there may be four RACK types which may be used to represent one or more of the included RACK indicators. Generally, in the disclosed embodiments, each RS 440 treats the data indicated as received in the ACK indicator as "don't care," and reports only the data received by the intermediate or access nodes (i.e., RSs 440) along the transmission path. In the illustration of FIG. 13, the ACK indicator identifies data blocks 1 and 7 as having been successfully received by SS 450. Blocks 1 and 7 are illustrated in FIG. 13 by the solid gray coloring.

In RACK type 0, referred to herein as "Selective RACK Map," the Block Sequence Number (BSN) of the ACK is reused in the RACK indicator to conserve resources. Therefore, in this RACK type, there are only 4 data blocks to report in the RACK indicator, i.e., 3, 5, 6, and 8, as data blocks 1 and 7 are reported in the ACK indicator. Blocks 3, 5, 6, and 8 are illustrated by the dotted gray filling, blocks 1 and 7 are illustrated by the solid gray filling. As a result, using the type 0 Selective RACK Map for this hop or segment, beginning with the BSN, the RACK data stream is "00101101."

RACK type 1, referred to herein as "Cumulative RACK Map," may be used when there are continuous data blocks to report. In this example, there are 4 continuous data blocks to report in the RACK indicator, i.e., 2, 3, 4, and 5. Therefore, the data stream "0100" will be used to indicate that four data blocks are ACKed. Blocks 2, 3, 4, and 5 are illustrated by the dotted gray filling, blocks 1 and 7 are illustrated by the solid gray filling. The data stream will begin next to the BSN. As a result, using the type 1 Cumulative RACK Map for this segment, beginning with the BSN, the RACK data stream may be "00100000," using the first four bits to indicate that there are 4 continuous data blocks (i.e., "0010" followed by four other bits). Alternatively, using the type 1 Cumulative RACK Map for this segment, beginning with the BSN, the RACK data stream may be "00000100," using the last four bits to indicate that there are 4 continuous data blocks (i.e., "0010" preceded by four other bits).

RACK type 2, referred to herein as "Cumulative with Selective RACK Map," may be used when there are continuous data blocks with some separated data blocks. In this example, in addition to the data blocks 1 and 7 of the ACK, data blocks 2, 3, 4, 6, and 8 also need to be reported. Therefore, the data stream "0011" will be used in a Selective RACK Map to indicate data blocks 2-4. Data stream "10101," beginning from the last indicated block in the Selective RACK Map will be used to indicate data blocks 6 and 8. In other words, the first data block indicated by "1" in the type 2 Cumulative with Selective RACK Map identifies the last block indicated in the Selective RACK Map. Blocks 1 and 7 are illustrated in FIG. 13 by the solid gray filling, blocks 2, 3, 6 and 8 are illustrated by the dotted gray filling, and the overlap of the Selective RACK Map with the type 2 Cumulative with Selective RACK Map is illustrated by diagonal stripes. As a result, using the type 2 Cumulative with Selective RACK Map for this segment, beginning with the BSN, the RACK data stream may be "01110101." Alternatively, using the type 2 Cumulative with Selective RACK Map for this segment, beginning with the BSN, the RACK data stream may be "10101011." In either case, the RACK data stream may be any combination of bits representing "011" and "10101."

RACK type 3, referred to herein as "Cumulative with R-Block Sequence," may be used to identify the ACK and NACK of the reported data blocks. Here, "1" may refer to ACK and "0" may refer to NACK. In this example, in addition to the data blocks 1 and 7 of the ACK, data blocks 2 and 3 should be reported as ACK, data blocks 4-7 should be reported as NACK, and data block 8 should be reported as ACK. Therefore, the Sequence ACK Map is "101," and the lengths of the following blocks are "0010," "0100," and "0001."

Using the exemplary ACK and RACK indicators, the control node, e.g., BS 430, can obtain information and determine the resource allocation for each segment. In resource allocation, for example, the required number of resources can be abstracted. In one embodiment, the number of non-indicated bits in the Selective RACK Map (RACK Type 0 and RACK Type 2) and the length of the block sequences (RACK Type 1, RACK Type 2, and RACK Type 3) may identify the number of required resources for retransmission. In data retransmission, the exact data block required for retransmission may also be abstracted. For example, data indicated by "0" in the Selective/Cumulative RACK Maps (RACK Type 0, RACK Type 1, and RACK Type 2) and indicated in the sequence of NACK blocks in the Cumulative with R-Block Sequence ACK Map may be identified for retransmission.

Figure 14:
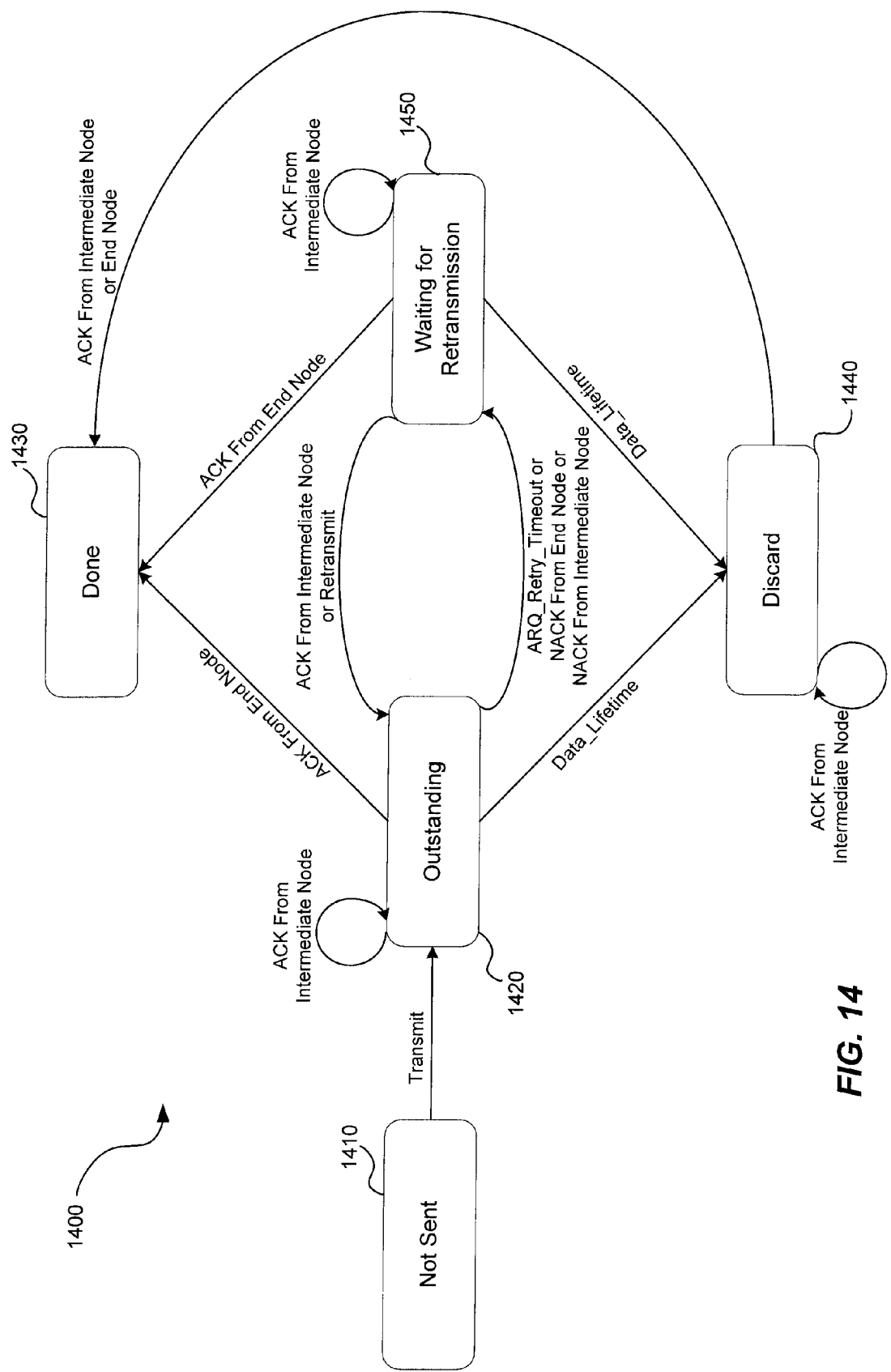
FIG. 14 is a state diagram of an exemplary state machine, consistent with certain disclosed embodiments.

FIG. 14 illustrates an exemplary ARQ state diagram 1400 according to certain disclosed embodiments. Generally, a state diagram may be used to depict the status and/or operation of a state machine in response to one or more triggering events. A state machine may be used to store a status of a device or apparatus, change the status of the device or apparatus, and/or cause the device or apparatus to perform one or more actions in response to one or more triggering events.

A state machine may be implemented using any combination of software and/or hardware. In one exemplary embodiment, each of RS 440 and BS 430 may be configured to include one or more state machines. In one exemplary embodiment, referring to FIG. 5c, each RS 440 and each BS 430 may include one or more state machines, implemented using a combination of software stored on, e.g., RAM 442 or ROM 443, and hardware configured to perform a process or action based upon one or more triggering events. For example, when a triggering event is received and/or identified by RS 440, an interrupt may be sent to CPU 441, causing CPU 441 to initiate one or more processes. In some embodiments, a state machine may be associated with a set of transmissions to a particular receiving device, e.g., SS 450 and/or BS 430. In other embodiments, a state machine may be associated with each transmission to a particular receiving device, e.g., SS 450 and/or BS 430. For reasons of simplicity and not limitation, description of FIG. 14 will be made with reference to an exemplary ARQ state machine of RS 440. However, BS 430 may also implement an ARQ state machine, and its corresponding functionality, such as disclosed in exemplary state diagram 1400 of FIG. 14.

As shown in FIG. 14, an exemplary ARQ state machine of RS 440 and/or BS 430 may include a plurality of states (e.g., Not Sent 1410, Outstanding 1420, Done 1430, Discard 1440, and Waiting for Retransmission 1450), and operation of the ARQ state machine may involve transitioning from one state to another. In one exemplary embodiment, the ARQ state may be defined in an ARQ control block or a tunnel data unit (TDU). A TDU may be used to pack several packet data units (PDUs) or ARQ data blocks into a single transmission data unit. The exemplary ARQ state diagram illustrated in FIG. 14 may be applied to any type of data unit transmission, including, for example, PDUs, TDUs, ARQ data blocks, etc.

Before data is sent by RS 440, the state of the ARQ state machine of RS 440 may be Not Sent 1410. In some embodiments, the ARQ state machine may be initially-set, or initialized, to Not Sent 1410. Upon transmission of the data to another node in the network, the ARQ state machine of RS 440 may move to Outstanding 1420, and may remain in Outstanding 1420 until one or more triggering events occurs. For example, in a case where no data errors occur, RS 440 may receive an ACK from the end node (e.g., SS 450), and the ARQ state machine of RS 440 may therefore move from Outstanding 1420 to Done 1430. If, however, RS 440 receives an ACK from another intermediate node (e.g., another RS 440) before it receives an ACK from the end node (e.g., SS 450), implying that some node successfully transmitted the data to the end node, the ARQ state machine of RS 440 may stay in Outstanding 1420, and wait for retransmission between the other intermediate node and the end node. In one exemplary embodiment, when RS 440 receives an ACK from an intermediate node, instead of moving from one state to another, the ARQ state machine of RS 440 may remain in Outstanding 1420.

Certain triggering events may cause RS 440 to move from Outstanding 1420 to Waiting for Retransmission 1450. For example, if an ARQ_Retry_Timeout occurs, the ARQ state machine of RS 440 may move to Waiting for Retransmission 1450. The occurrence of an ARQ_Retry_Timeout may reflect the lapse of a predetermined period of time associated with trying to retransmit the data. The ARQ state machine of RS 440 may remain in Waiting for Retransmission 1450 until it receives an ACK from the end node or another intermediate node or until the data is retransmitted. Similarly, the ARQ state machine of RS 440 may move from Outstanding 1420 to Waiting for Retransmission 1450 when it receives a NACK from an end node (e.g., SS 450) or an intermediate node (e.g., another RS 440). The ARQ state machine of RS 440 may remain in Waiting for Retransmission 1450 until it receives a triggering event. In one exemplary embodiment, the ARQ state machine of RS 440 may remain in Waiting for Retransmission 1450 until it receives an ACK from the end node or another intermediate node or until the data is retransmitted.

In one exemplary embodiment, once RS 440 receives an ACK from another intermediate node or the data is retransmitted, the ARQ state machine of RS 440 will move from Waiting for Transmission 1450 back to Outstanding 1420. If, however, data transmission or retransmission is not completed within a lifetime value of the data, referred to as the "Data_Lifetime," the data is discarded and the ARQ state machine of RS 440 moves to Discard 1440. In another exemplary embodiment, instead of transitioning from Waiting for Retransmission 1450 to Outstanding 1420 upon receipt of an ACK from an intermediate node, the ARQ state machine of RS 440 may remain in Waiting for Retransmission 1450 until another of one or more predetermined triggering events occurs.

In two-segment ARQ mode, there may be two types of state machines: an access link ARQ state machine and a relay link ARQ state machine. The access link ARQ state machine may operate in association with transmissions between an SS 450 and its access RS 440 (i.e., the network access point for the SS 450) utilizing the access link. The relay link ARQ state machine may operate in association with transmissions between BS 430 and the access RS 440 utilizing the relay link. When operating according to two-segment ARQ mode, BS 430 may schedule retransmission to access RS 440 when an ARQ block or TDU is corrupted or lost in the relay link. Correspondingly, RS 440 may schedule retransmission to SS 450 when an ARQ block or TDU is corrupted in the access link. When an intermediate RS 440 exists between BS 430 and an access RS 440, the intermediate RS 440 may forward the ARQ block and ARQ information between BS 430 and the access RS 440.

In a system using non-tunnel mode, the ARQ Information Element (IE) corresponding to non-tunnel transmission may be used by BS 430 and an access RS 440 to indicate ACK and/or NACK of the data transmitted between the BS 430 and the access RS 440. In a system using tunnel mode, the ARQ IE for tunnel packet transmission may be used by BS 430 and an access RS 440 to indicate ACK and/or NACK of the data transmitted between the BS 430 and the access RS 440. In both modes (i.e., tunnel and non-tunnel transmission mode), the ARQ IEs are transported either as a packed payload (i.e., "piggybacked") with a packed MAC PDU or as a payload of a standalone MAC PDU.

The disclosed embodiments may be implemented within any network configuration utilizing wireless technology, protocols, or standards. In this manner, the disclosed embodiments may enable the system to more effectively utilize resources. By localizing the retransmission of packet data, the disclosed embodiments may achieve improved performance. In particular, the disclosed embodiments may reduce signal processing time and improve data traffic flow associated with error detection and retransmission of data in wireless networks. More particularly, the disclosed systems and methods may improve error detection and correction in wireless networks having multi-hop transmission. In addition, the disclosed systems and methods may reduce the effects of mobility in wireless networks as a result of intra-cell handover (e.g., between RS 440*c* and RS 440*b*) as well as inter-cell handover (e.g., between RS 440*c* and an RS 440 outside the coverage of BS 430).

It will be apparent to those skilled in the art that various modifications and variations can be made in the system and method for error detection and correction in communication networks. It is intended that the standard and examples be considered as exemplary only, with a true scope of the disclosed embodiments being indicated by the following claims and their equivalents.

What is claimed is:

1. A method for transmission control in a wireless communication system, comprising:
   determining a transmission resource allocation for at least one segment of a transmission path between a transmitting device and a receiving device, wherein the transmission path includes one or more intermediate devices;
   transmitting, by the transmitting device, data to the receiving device;
   receiving, by the transmitting device from the one or more intermediate devices, one or more supplemental receipt indicators, wherein the one or more supplemental receipt indicators are associated with the data sent to the receiving device;
   determining a retransmission resource allocation for the at least one segment of the transmission path between the transmitting device, the one or more intermediate devices, and the receiving device; and
   initiating retransmission of the data based on at least one of the one or more supplemental receipt indicators.

2. The method as in claim 1, wherein determining the retransmission resource allocation for each segment of the transmission path further includes:
   communicating with each of the one or more intermediate devices located along the transmission path between the transmitting device and the receiving device.

3. The method as in claim 1, further including:
   receiving, from the receiving device, a receipt indicator, wherein the receipt indicator is in response to the data sent to the receiving device;
   determining the retransmission resource allocation for one or more segments of the transmission path between the transmitting device, the one or more intermediate devices, and the receiving device based on at least one of the receipt indicator and the one or more supplemental receipt indicators; and
   initiating retransmission of the data based on at least one of the receipt indicator and the one or more supplemental receipt indicators.

4. The method as in claim 3, further including:
   determining, by the transmitting device, the identity of the data received by each of the one or more intermediate devices and the receiving device based on the receipt indicator and the one or more supplemental receipt indicators.

5. The method as in claim 3, wherein the receipt indicator is either an ACK indicator or a NACK indicator and the one or more supplemental receipt indicators are Relay ACK (RACK) indicators.

6. The method as in claim 5, wherein the ACK indicator or the NACK indicator identify a first set of one or more transmission data packets successfully received by the receiving device, and the RACK indicators identify a second set of one or more transmission data packets which were successfully received by the one or more intermediate devices but which were not successfully received by the receiving device.

7. The method as in claim 1, wherein the one or more supplemental receipt indicators are Relay ACK (RACK) indicators.

8. The method as in claim 7, wherein the RACK indicators identify a set of one or more transmission data packets which were successfully received by the one or more intermediate devices but which were not successfully received by the receiving device.

9. The method as in claim 1, further including:
   storing, by the transmission device, the data in a storage area.

10. A wireless communication device for wireless communication, the wireless communication device comprising:
    at least one memory to store data and instructions; and
    at least one processor configured to access the memory and, when executing the instructions, to:
      determine a transmission resource allocation for at least one segment of a transmission path between the wireless communication device and a receiving device, wherein the transmission path includes one or more intermediate devices;
      transmit data to the receiving device;

receive, by the transmitting device from the one or more intermediate devices, one or more supplemental receipt indicators, wherein the one or more supplemental receipt indicators are associated with the data sent to the receiving device;

determine a retransmission resource allocation for the at least one segment of the transmission path between the wireless communication device, the one or more intermediate devices, and the receiving device; and initiate retransmission of the data based on at least one of the one or more supplemental receipt indicators.

11. The wireless communication device as in claim 10, wherein when the at least one processor is configured to determine the retransmission resource allocation, the at least one processor is further configured to:

communicate with each of the one or more intermediate devices located along the transmission path between the transmitting device and the receiving device.

12. The wireless communication device as in claim 10, wherein the at least one processor is further configured to:

receive, from the receiving device, a receipt indicator, wherein the receipt indicator is in response to the data sent to the receiving device;

determine the retransmission resource allocation for one or more segments of the transmission path between the wireless communication device, the one or more intermediate devices, and the receiving device based on at least one of the receipt indicator and the one or more supplemental receipt indicators; and initiate retransmission of the data based on at least one of the receipt indicator and the one or more supplemental receipt indicators.

13. The wireless communication device as in claim 12, wherein the at least one processor is further configured to:

determine the identity of the data received by each of the one or more intermediate devices and the receiving device based on the receipt indicator and the one or more supplemental receipt indicators.

14. The wireless communication device as in claim 12, wherein the receipt indicator is either an ACK indicator or a NACK indicator and the one or more supplemental receipt indicators are Relay ACK (RACK) indicators.

15. The wireless communication device as in claim 14, wherein the ACK indicator or the NACK indicator identify a first set of one or more transmission data packets successfully received by the receiving device, and the RACK indicators identify a second set of one or more transmission data packets which were successfully received by the one or more intermediate devices but which were not successfully received by the receiving device.

16. The wireless communication device as in claim 10, wherein the one or more supplemental receipt indicators are Relay ACK (RACK) indicators.

17. The wireless communication device as in claim 16, wherein the RACK indicators identify a set of one or more transmission data packets which were successfully received by the one or more intermediate devices but which were not successfully received by the receiving device.

18. The wireless communication device as in claim 10, wherein the at least one processor is further configured to: store the data in a storage area.

19. A method for transmission control in a wireless communication system, comprising:

receiving, by an intermediate device, transmission data for transmission to a receiving device;

forwarding the transmission data to a next subordinate intermediate device or the receiving device in a transmission path between the intermediate device and the receiving device;

initiating a timer, wherein the timer is set according to a round-trip transmission time between the intermediate device and the receiving device;

generating a supplemental receipt indicator;

if the intermediate device receives at least one of a receipt indicator and one or more subordinate supplemental receipt indicators before an expiration of the timer:

including the generated supplemental receipt indicator with the at least one of the receipt indicator and the one or more subordinate supplemental receipt indicators, and sending the at least one of the receipt indicator and the one or more subordinate supplemental receipt indicators and the included generated supplemental receipt indicator to a next superordinate intermediate device in the transmission path between the intermediate device and a transmission device or the transmission device; and if the intermediate device does not receive at least one of a receipt indicator or one or more subordinate supplemental receipt indicators before the expiration of the timer:

sending the generated supplemental receipt indicator to the next superordinate intermediate device or the transmission device.

20. The method as in claim 19, wherein the round-trip transmission time includes a transmission time for each segment along the transmission path between the intermediate device and the receiving device, and one or more timing offsets associated with the receiving device and any intermediate device located along the transmission path between the intermediate device and the receiving device.

21. The method as in claim 19, further including:

determining if the transmission data includes new data; and if the transmission data includes new data, storing the new data in a storage area of the intermediate device.

22. The method as in claim 19, further including:

determining if the transmission data is to include retransmission data;

if the transmission data is to include retransmission data, retrieving the retransmission data from a storage area of the intermediate device; and forwarding the transmission data and retransmission data to a next intermediate device or the receiving device in a transmission path between the intermediate device and the receiving device.

23. The method as in claim 19, wherein the receipt indicator is either an ACK indicator or a NACK indicator and the one or more subordinate supplemental receipt indicators are Relay ACK (RACK) indicators.

24. The method as in claim 23, wherein the ACK indicator or the NACK indicator identify a first set of one or more transmission data packets successfully received by the receiving device, and the one or more RACK indicators identify a second set of one or more transmission data packets which were successfully received by one or more subordinate intermediate devices but which were not successfully received by the receiving device.

25. The method as in claim 19, wherein the supplemental receipt indicator is a Relay ACK (RACK) indicator.

26. The method as in claim 25, wherein the RACK indicator identifies the transmission data successfully received by the intermediate device but which was not successfully received by the receiving device.

27. A wireless communication device for wireless communication, the wireless communication device comprising:
- at least one memory to store data and instructions; and
- at least one processor configured to access the memory and, when executing the instructions, to:
  - receive, by the wireless communication device, transmission data for transmission to a receiving device;
  - forward the transmission data to a next subordinate intermediate device or the receiving device in a transmission path between the wireless communication device and the receiving device;
  - initiate a timer, wherein the timer is set according to a round-trip transmission time between the wireless communication device and the receiving device;
  - generate a supplemental receipt indicator;
  - if the wireless communication device receives at least one of a receipt indicator and one or more subordinate supplemental receipt indicators before an expiration of the timer:
    - include the generated supplemental receipt indicator with the at least one of the receipt indicator and the one or more subordinate supplemental receipt indicators, and
    - send the at least one of the receipt indicator and the one or more subordinate supplemental receipt indicators and the included generated supplemental receipt indicator to a next superordinate intermediate device in the transmission path between the wireless communication device and a transmission device or the transmission device; and
  - if the wireless communication device does not receive at least one of a receipt indicator or one or more subordinate supplemental receipt indicators before the expiration of the timer:
    - send the generated supplemental receipt indicator to the next superordinate intermediate device or the transmission device.

28. The wireless communication device as in claim 27, wherein the round-trip transmission time includes a transmission time for each segment along the transmission path between the wireless communication device and the receiving device, and one or more timing offsets associated with the receiving device and any intermediate device located along the transmission path between the wireless communication device and the receiving device.

29. The wireless communication device as in claim 27, wherein the at least one processor is further configured to:
- determine if the transmission data includes new data; and
- if the transmission data includes new data, store the new data in a storage area of the wireless communication device.

30. The wireless communication device as in claim 27, wherein the at least one processor is further configured to:
- determine if the transmission data is to include retransmission data;
- if the transmission data is to include retransmission data, retrieve the retransmission data from a storage area of the wireless communication device; and
- forward the transmission data and retransmission data to a next intermediate device or the receiving device in a transmission path between the wireless communication device and the receiving device.

31. The wireless communication device as in claim 27, wherein the receipt indicator is either an ACK indicator or a NACK indicator and the one or more subordinate supplemental receipt indicators are Relay ACK (RACK) indicators.

32. The wireless communication device as in claim 31, wherein the ACK indicator or the NACK indicator identify a first set of transmission data successfully received by the receiving device, and the one or more RACK indicators identify a second set of one or more transmission data which were successfully received by one or more subordinate intermediate devices but which were not successfully received by the receiving device.

33. The wireless communication device as in claim 27, wherein the supplemental receipt indicator is a Relay ACK (RACK) indicator.

34. The method as in claim 33, wherein the RACK indicator identifies the transmission data successfully received by the wireless communication device but which was not successfully received by the receiving device.

35. A method for operating a wireless communication device in a wireless communication system, the method comprising:
- setting a device state to a first state, wherein the first state is an initial state;
- changing, upon occurrence of a first triggering event, the device state from the first state to a second state, wherein the second state is defined as one in which data has been transmitted and a relay timer has not expired;
- changing, when the relay timer expires, the device state from the second state to a third state and initiating retransmission of the data;
- changing, when the relay timer has not expired and the wireless communication device receives one of an intermediate node NACK indicator, an end node NACK indicator, or a timeout, the device state from the second state to the third state; and
- changing, when the wireless communication device receives an end node ACK indicator and the relay timer has not expired, the device state from the second state to a fourth state.

36. The method of claim 35, further including:
- maintaining, when the wireless communication device receives an intermediate node ACK indicator, the second state as the device state.

37. The method of claim 35, further including:
- maintaining, when the device state is in the third state and the wireless communication device receives either the intermediate node ACK indicator or a retransmission indicator, the third state as the device state.

38. The method of claim 35, further including:
- changing, when the device state is in the third state and the data has been retransmitted, the device state from the third state to the second state; and
- initiating retransmission of the data.

39. The method of claim 35, further including:
- changing, when the device state is in the third state and the wireless communication device receives the intermediate node ACK indicator, the device state from the third state to the second state.

40. The method of claim 35, further including:
- changing, when the device state is in the third state and the wireless communication device receives the end node ACK indicator, the device state from the third state to the fourth state.

41. The method of claim 35, further including:
- discarding, when the device state is in the third state and the relay timer expires, the data; and
- changing, when the device state is in the third state and the relay timer expires, the device state from the third state to a fifth state.

42. The method of claim 35, further including:
changing, if the device state is in a fifth state and the wireless communication device receives an end node ACK indicator, the device from the fifth state to the fourth state.

43. The method of claim 35, further including:
maintaining, if the device state is in a fifth state and the wireless communication device receives an intermediate node ACK indicator, the fifth state as the device state.

44. The method of claim 35, further including:
changing, when the device state is in one of the second state or the fourth state, and the wireless communication device receives a data-lifetime timeout, the device state from the one of the second state or the fourth state to the fifth state.

45. The method of claim 35, wherein the first triggering event is a transmission of new data.

46. A wireless communication device for wireless communication, the wireless communication device comprising:
at least one memory to store data and instructions; and
at least one processor configured to access the memory and, when executing the instructions, to:
set a device state to a first state, wherein the first state is an initial state;
change, upon occurrence of a first triggering event, the device state from the first state to a second state, wherein the second state is defined as one in which data has been transmitted and a relay timer has not expired;
change, when the relay timer expires, the device state from the second state to a third state and initiate retransmission of the data;
change, when the relay timer has not expired and the wireless communication device receives one of an intermediate node NACK indicator, an end node NACK indicator, or a timeout, the device state from the second state to the third state; and
change, when the wireless communication device receives an end node ACK indicator and the relay timer has not expired, the device state from the second state to a fourth state.

47. The wireless communication device of claim 46, wherein the processor is further configured to:
maintain, when the wireless communication device receives an intermediate node ACK indicator, the second state as the device state.

48. The wireless communication device of claim 46, wherein the processor is further configured to:
maintain, when the device state is in the third state and the wireless communication device receives either the intermediate node ACK indicator or a retransmission indicator, the third state as the device state.

49. The wireless communication device of claim 46, wherein the processor is further configured to:
change, when the device state is in the third state and the data has been retransmitted, the device state from the third state to the second state; and
initiate retransmission of the data.

50. The wireless communication device of claim 46, wherein the processor is further configured to:
change, when the device state is in the third state and the wireless communication device receives the intermediate node ACK indicator, the device state from the third state to the second state.

51. The wireless communication device of claim 46, wherein the processor is further configured to:
change, when the device state is in the third state and the wireless communication device receives the end node ACK indicator, the device state from the third state to the fourth state.

52. The wireless communication device of claim 46, wherein the processor is further configured to:
discard, when the device state is in the third state and the relay timer expires, the data; and
change, when the device state is in the third state and the relay timer expires, the device state from the third state to a fifth state.

53. The wireless communication device of claim 46, wherein the processor is further configured to:
change, if the device state is in a fifth state and the wireless communication device receives an end node ACK indicator, the device from the fifth state to the fourth state.

54. The wireless communication device of claim 46, wherein the processor is further configured to:
maintain, if the device state is in a fifth state and the wireless communication device receives an intermediate node ACK indicator, the fifth state as the device state.

55. The wireless communication device of claim 46, wherein the processor is further configured to:
maintain, when the device state is in a fifth state and the wireless communication device receives an intermediate node ACK indicator, the fifth state as the device state.

56. The wireless communication device of claim 46, wherein the processor is further configured to:
change, when the device state is in one of the second state or the fourth state, and the wireless communication device receives a data_lifetime timeout, the device state from the one of the second state or the fourth state to a fifth state.

57. The wireless communication device of claim 46, wherein the first triggering event is a transmission of new data.

* * * * *